United States Patent [19]
Matula et al.

[11] Patent Number: 5,862,059
[45] Date of Patent: *Jan. 19, 1999

[54] TABLE COMPRESSION USING BIPARTITE TABLES

[75] Inventors: David William Matula; Debjit Das Sarma, both of Dallas, Tex.

[73] Assignee: National Semiconductor Corporation, Santa Clara, Calif.

[*] Notice: This patent issued on a continued prosecution application filed under 37 CFR 1.53(d), and is subject to the twenty year patent term provisions of 35 U.S.C. 154(a)(2).

[21] Appl. No.: 504,279

[22] Filed: Jul. 19, 1995

[51] Int. Cl.⁶ .................................. G06F 1/02; G06F 7/52
[52] U.S. Cl. ........................................ 364/718.01; 364/765
[58] Field of Search .............................. 364/715.01, 735, 364/752, 765

[56] References Cited

U.S. PATENT DOCUMENTS

| | | | |
|---|---|---|---|
| 3,648,038 | 3/1972 | Sierra | 364/765 |
| 4,797,849 | 1/1989 | Nakano | 364/765 |
| 5,117,385 | 5/1992 | Gee | 364/757 |
| 5,184,317 | 2/1993 | Pickett | 364/735 |
| 5,321,642 | 6/1994 | Goldberg | 364/721 |
| 5,539,682 | 7/1996 | Jain et al. | 364/765 |

*Primary Examiner*—Chuong Dinh Ngo
*Attorney, Agent, or Firm*—Andrew Viger

[57] ABSTRACT

A bipartite compression technique is used to implement a bipartite reciprocal table that provides seed reciprocal values for multiplicative (reciprocal refinement) division. The bipartite reciprocal table (12) includes component tables P and N. The input table index is partitioned into high, middle, and low order parts $[x_h|x_m|x_1]$'the high and middle order parts $[x_h|x_m]$ index the P Table, and the high and low order parts $[x_h|x_1]$ index the N Table. The P and N Tables provide first and second component outputs which form a redundant output from the bipartite lookup table. The bipartite table output may be (a) optimal in that, for each entry in each table, the maximum relative error is the minimum possible, and/or (b) when fused with rounding, faithful (i.e., accurate to one unit in the last place). In an exemplary implementation, the bipartite reciprocal table is used in combination with a Booth recoded multiplier —the redundant borrow-save output from the bipartite table is input directly to the Booth recoder, such that the Booth recoder performs a fusion of the first and second component outputs.

18 Claims, 2 Drawing Sheets

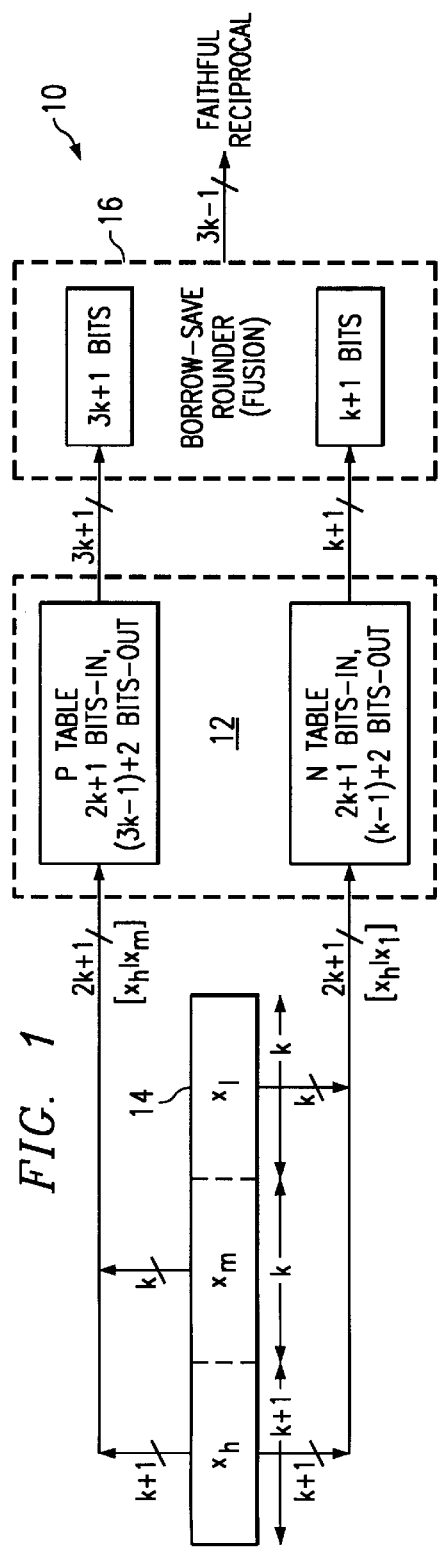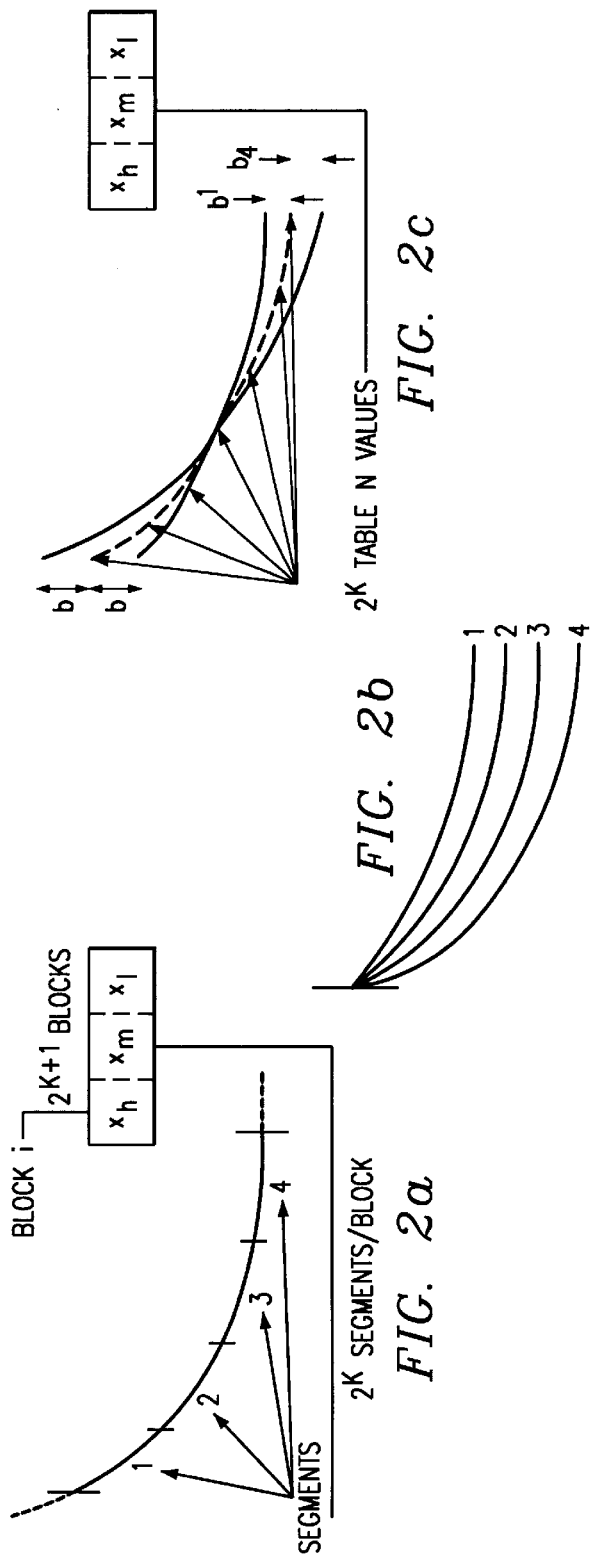

TABLE COMPRESSION USING BIPARTITE TABLES

BACKGROUND

1. Technical Field

The invention relates generally to arithmetic processing systems, and more particularly relates to look-up tables used to obtain function values, such as seed values for iterative refinement division or square root.

In an exemplary embodiment, the invention is used to provide table look-up of reciprocal seed values for a conventional multiplicative division implementation.

2. Related Art.

Floating point units (and other arithmetic processors) commonly use multiplier based algorithms for division. These division algorithms initially employ a seed reciprocal of the divisor.

The seed reciprocals have a selected number of bits of accuracy. Iterative multiplies are performed to iteratively increase the accuracy of the reciprocal approximation until a final quotient value of predetermined accuracy can be obtained.

The seed reciprocals are typically obtained from a ROM reciprocal look-up table, or equivalent PLA (programmed logic array). The number of table input index bits and table output bits of the seed reciprocals determines the size of the look-up table —more input bits allowing more bits of accuracy in the seed reciprocals reduces the necessary number of iterative multiply cycles, reducing division time albeit at the cost of exponential growth in the reciprocal table size.

Without limiting the scope of the invention, this background information is provided in the context of a specific problem to which the invention has application: for a floating point unit design, achieving reciprocal table compression to improve the design trade-off between division time (i.e., the number of necessary interative multiply cycles) and reciprocal table size. A collateral design problem is establishing, for a desired accuracy in reciprocal table output, what is the minimum table size required.

Current day designs of IEEE standard floating point units for PC's and workstations generally have substantial design effort and chip area devoted to providing a multiplier with at most a couple of cycles latency. In addition to special function computations, this multiplier resource is typically exploited to obtain faster division. Moreover, if multiplicative division is used, it is common to also use a multiplicative square root algorithm.

Newton-Raphson, convergence, prescaled, and short reciprocal division are multiplier based iterative division algorithms that have been employed in recent floating point unit implementations. These multiplicative division algorithms each provide speedups by factors of 2 to 4 over the traditional shift-and-subtract iterative division algorithms such as non-restoring and SRT. However, for these multiplicative division algorithms, note that division time relates to multiplier latency, not throughput, because pipelining through the multiplier cannot be employed for the iterative dependent multiplications required for reciprocal refinement.

Each of the multiplicative division algorithms initially employs a seed (approximate) reciprocal of the divisor obtained (such as by table look-up) with a certain precision measured by the number of bits of accuracy. In general, the precision of an approximate reciprocal of an input argument measured in bits of accuracy is given by the negative base 2 logarithm of the relative error between the approximate reciprocal and the infinitely precise reciprocal of the input argument.

To illustrate the affect of the accuracy of the seed reciprocal on the division time of the multiplicative division algorithm, consider Newton-Raphson division, which uses a reciprocal refinement algorithm that converges quadratically. Initially a seed (approximate) reciprocal of the divisor is obtained with a certain precision measured by the number of bits of accuracy. Iterative multiplier operations are used to compute successive refined reciprocal approximations of the divisor to a desired precision. Specifically, each Newton-Raphson iteration effectively doubles the precision of the reciprocal approximation, i.e. doubles the number of accurate bits. Thus, the precision of the seed reciprocal directly determines the number of such iterations to obtain a final reciprocal approximation with a desired precision.

The final reciprocal approximation is then multiplied by the dividend to produce an approximate quotient. The quotient is multiplied by the divisor and subtracted from the dividend to obtain a corresponding remainder. Note that no part of the quotient is generated until the multiplication of the dividend by the refined reciprocal in the last step.

The Newton-Raphson division algorithm for Q=N/D is:
1. Initialize: $x_0 \approx 1/D$
2. Iterate: $x_{i+1} = x_i \times (2 - D \times X_i)$
3. Final: $Q = X_{last} \times N$  $R = N - (Q \times D)$ $X_i \approx 1/D$ can be written as $x_i \approx (1/D)(1+\epsilon)$
where $\epsilon$ is the relative error in the approximation (assumed to be small). Thus, in the iterative step:
$D \times X_i = 1 + \epsilon$ such that
$2 - D \times X_i = 1 - \epsilon$ So that, for the next iteration $$\begin{aligned} X_{i+1} &= X_i \times (2 - D \times X_i) \\ &= (1/D)(1 + \epsilon)(1 - \epsilon) \\ &= (1/D)(1 - \epsilon^2) \end{aligned}$$

That is, for each iteration, the relative error as measured by the number of accurate bits doubles.

Consider the application of this algorithm to obtain the double precision (53 bits) quotient Q where N and D are double precision dividend (numerator) and divisor respectively. N and D are normalized ($1 \leq N, D < 2$), such that the reciprocal of D must fall in the interval ($\frac{1}{2}$, 1], where "()" indicate exclusive bounds and "[]" indicate inclusive bounds.

If a single value of the seed reciprocal $X_0 \approx 1/D$ is used for any $1 \leq D < 2$ then $X_0 \approx \frac{2}{3}$ is the most accurate seed reciprocal, accurate to about 1.585 bits. With $X_0 = \frac{2}{3}$, the Newton-Raphson division requires 6 iterations (12 multiplications) to attain the desired number of bits of accuracy for a double precision quotient ($1.5 \rightarrow 3 \rightarrow 6 \rightarrow 12 \rightarrow 24 \rightarrow 48 \rightarrow \rightarrow 53+$).

Notice that it takes three iterations (6 multiplications) to increase the accuracy to over 7 bits. These initial iterations can be conveniently replaced by a look-up table to provide a seed reciprocal accurate to 7 bits, specifically requiring 7 leading bits of D for table look-up to provide a seed reciprocal $X_0$ accurate to 7.484 bits. With this small reciprocal table having 128 entries, the algorithm requires only 3 iterations (6 multiplications) for a double precision quotient ($7 \rightarrow 14 \rightarrow 28 \rightarrow 53+$). Thus, using a seed reciprocal table of $2^7 \times 7$ bits=896 bits, the number of multiplications is cut in half.

More bits of accuracy in the seed reciprocal further reduces the number of necessary multiply cycles. Consider the seed reciprocal $X_0$ to be accurate to 14 bits. Then the above algorithm requires only 2 iterations (4 multiply cycles) for a double precision quotient (14→28→53+). However at least 14 leading bits of D are needed for input to a conventional reciprocal table to provide a seed reciprocal accurate to 14 bits. Such a table requires $2^{14} \times 14$ bits=230 Kbits a size that is prohibitive for current technology.

The limitation of conventional reciprocal tables is that increasing the accuracy of the seed reciprocal by one bit results in more than doubling the reciprocal table size. Because there are no obvious efficient techniques for improving the rate of convergence beyond the current quadratically converging multiplicative division algorithms, such as Newton-Raphson, the critical design trade-off is between table size (and therefore area) and division cycle time.

Table compression can be obtained by applying conventional interpolation techniques to the table output. However, interpolation has the disadvantage of requiring the added cost of a multiplication and/or addition to effect the interpolation [Fa 81, Fe 67, Na 87].

A collateral issue to table size is to specifically define the accuracy that can be obtained from a table of a given size —stated another way, for a desired accuracy of the seed reciprocal, the design problem is to determine what is the minimum table size. For current reciprocal table designs, rather than pursue the exhaustive investigation of minimum table size at the bit level, the design approach has often been to employ oversized tables.

The proper accuracy measure of a reciprocal table to be optimized depends on the division algorithm being implemented and the size and architecture of the multiplier employed. In general, two principal accuracy measures have been used for reciprocal tables: precision and units in the last place (ulps). In particular, if table output is guaranteed accurate to one ulp for all inputs, then the table is termed faithful. A third approach to measuring the accuracy of a reciprocal table is the percentage of inputs that yield round-to-nearest output.

Reciprocal tables are typically constructed by assuming that the argument is normalized $1 \leq X < 2$ and truncated to k bits to the right of the radix point —$1.b_1 b_2 \ldots b_k$. These k bits are used to index a reciprocal table providing m output bits which are taken as the m bits after the leading bit in the m+1 bit fraction reciprocal approximation —$0.1 b_2 b_3 \ldots b_{m+1}'$. Such a table will be termed a k-bits-in m-bits-out reciprocal table of size $2^k \times m$ bits.

Regarding the precision measure of table accuracy, the maximum relative error for any k-bits-in m-bits-out reciprocal table denotes the supremum of the relative errors obtained between 1/x and the table value for the reciprocal of x for $1 \leq x < 2$. The precision in bits of the table is the negative base two logarithm of this supremum. A table precision of $\alpha$ bits (with $\alpha$ not necessarily an integer) then simply denotes that the approximation of 1/x by the table value will always yield a relative error of at most $\frac{1}{2}^\alpha$. For Newton-Raphson (and other convergence division algorithms), the precision of the table determines the number of dependent (i.e., non-pipelined) multiplications to obtain the quotient of desired accuracy.

The following Table gives the precision in bits of the k-bits-in m-bits-out reciprocal table for the most useful cases $3 \leq k$, $m \leq 12$, facilitating evaluating tradeoffs between table size and the number of reciprocal refinement iterations to achieve a desired final precision. This Table appears in [DM 94].

| bits in/ | 3 | 4 | 5 | 6 | 7 | 8 | 9 | 10 | 11 | 12 |
|---|---|---|---|---|---|---|---|---|---|---|
| bits out | | | | | | | | | | |
| 3 | 3.540 | 4.000 | 4.000 | 4.000 | 4.081 | 4.081 | 4.081 | 4.081 | 4.087 | 5.087 |
| 4 | 4.000 | 4.678 | 4.752 | 5.000 | 5.000 | 5.000 | 5.042 | 5.042 | 5.042 | 5.042 |
| 5 | 4.000 | 4.752 | 5.573 | 5.850 | 5.891 | 6.000 | 6.000 | 6.000 | 6.022 | 6.022 |
| 6 | 4.000 | 5.000 | 5.850 | 6.476 | 6.790 | 6.907 | 6.950 | 7.000 | 7.000 | 7.000 |
| 7 | 4.081 | 5.000 | 5.891 | 6.790 | 7.484 | 7.775 | 7.888 | 7.948 | 7.976 | 8.000 |
| 8 | 4.081 | 5.000 | 6.000 | 6.907 | 7.775 | 8.453 | 8.719 | 8.886 | 8.944 | 8.974 |
| 9 | 4.081 | 5.042 | 6.000 | 6.950 | 7.888 | 8.719 | 9.430 | 9.725 | 9.852 | 9.942 |
| 10 | 4.081 | 5.042 | 6.000 | 7.000 | 7.948 | 8.886 | 9.725 | 10.443 | 10.693 | 10.858 |
| 11 | 4.087 | 5.042 | 6.022 | 7.000 | 7.976 | 8.944 | 9.582 | 10.693 | 11.429 | 11.701 |
| 12 | 4.087 | 5.042 | 6.022 | 7.000 | 8.000 | 8.974 | 9.942 | 10.858 | 11.701 | 12.428 |

Regarding the faithfulness measure of table accuracy, reciprocal table output is faithful if it is accurate to one ulp (unit in the last place), i.e. the table output always has less than one ulp deviation from the infinitely precise reciprocal of the infinitely precise input argument. The general measure of accuracy is the determination of the worst case error in ulps —although a sufficiently large number of input guard bits allows a worst case error bound approaching one half ulp, the useful and computationally tractable threshold of one ulp accuracy is a conventional standard for transcendental functions where infinitely precise evaluation is not tractable.

Regarding the faithfulness measure of accuracy, for both the prescale and short reciprocal division algorithms, the size (length in bits) of the reciprocal affects the size of the circuitry employing the reciprocal [BM 93, EL 94, Na 87, WF 91]. Many compelling arguments can be made in favor of providing that the final results of function approximation should both (a) satisfy a one ulp bound (faithfulness), and (b) uniformly attempt to maximize the percentage of input arguments that are rounded to nearest [AC 86, BM 93, FB 91, Ta 89, Ta 90, Ta 91]. One approach is to have the table result itself be the round-to-nearest value of the infinitely precise reciprocal, providing a useful metric for those platforms where a reciprocal instruction is provided in hardware. This requires that the table input be the full argument precision, which is currently prohibitive in table size even for single precision arguments (23 bits).

A robust reciprocal table construction algorithm that is appropriately optimal for each of the two principal accuracy measures, precision and faithfulness (ulp), is the midpoint reciprocal algorithm described in [DM 94]. The midpoint reciprocal methodology generates tables such that the relative error for each table entry is minimized, thereby uniformly maximizing table output precision. This table design methodology further generates minimum sized tables to guarantee faithful reciprocals for each table entry, and for faithful tables maximizes the percentage of input values obtaining round-to-nearest output.

The midpoint reciprocal design methodology generates tables that have maximum table precision. For such k-bits-in m-bits-out tables, the design methodology generates a k-bits-in, k-bits-out table with precision at least k+0.415 bits for any k, and more generally with g guard bits that for the m=(k+g)-bits-out table the precision is at least $k+1 - \log_2 (1+\frac{1}{2}^{g+1})$ for any k. To determine extreme-case test data, and to compute the precision of a reciprocal table without prior construction of the full reciprocal table, the midpoint reciprocal design methodology only requires generation and inspection of a small portion of such a table to identify input values guaranteed to include the worst case relative errors in the table.

The precision and faithfulness (ulp) measures of lookup table quality, and the midpoint reciprocal algorithm for generating optimal conventional lookup tables regarding these metrics, establish a benchmark for the size and accuracy of conventional tables. This benchmark can be used in assessing the quality of any table compression methodology in terms of accuracy versus table size.

References

[AC 86] R. C. Agarwal, J. W. Cooley et al, 'New Scaler and Vector Elementary Functions for the IBM/370", in IBM J. Res. and Develop., Vol.30, No. 2, March 1986, pp 126–144.

[BM 93] W. B. Briggs and D. W. Matula, "A 17×69 Bit Multiply and Add Unit with Redundant Binary Feedback and Single Cycle Latency" in *Proc. 11th IEEE Synp. Comput. Arithmetic*, 1993, pp 163–170.

[DM 94] D. Das Sarma and D. W. Matula, "Measuring the Accuracy of ROM Reciprocal Tables" in *IEEE Trans. Comput.*, Vol. 43, No. 8, August 1994, pp 932–940.

[DM 95] D. Das Sarma and D. W. Matula, "Faithful Bipartite ROM Reciprocal Tables", Technical Report, Computer Science Department, Southern Methodist University, May 1995.

[EL 94] M..D. Ercegovac, T. Lang and P..Montusdd, "Very High Radix Division with Selection by Rounding and Prescaling", in *IEEE Trans. Comput.*, Vol. 43, No. 8, August 1994, pp 909–918.

[Fa 81] P. M. Farmwald, "On the Design of High Performance Digital Arithmetic Units", in *Ph. D. thesis, Stanford University*, 1981.

[FB 91] W. E. Ferguson and T. Brightman, "Accurate and Monotone Approximations of Some Transcendental Functions", in *Proc. 10th IEEE Symp. Comput. Arithmetic*, 1991, pp 237–244.

[Fe 67] D. Ferrari, "A Division Method Using a Parallel Multiplier", in IEEE Trans. Electron. Comput., 1967, EC-16, pp 224–226.

[FS 89] D. L. Fowler and J. E. Smith, "An Accurate High Speed Implementation of Division by Reciprocal Approximation", in *Proc 9th IEEE Symp. Comput. Arithmetic*, 1989, pp 60–67.

[Na 87] H. Nakano, "Method And Apparatus For Division Using Interpolation Approximation", in *U.S. Pat.* No. 4,707, 798, 1987.

[Ta 91] P. T. P. Tang, "Table-Lookup Algorithms for Elementary Functions and Their Error Analysis", in Proc. 10th IEEE Symp. Comput. Arithmetic, 1991, pp 232–236.

[Ta 90] P. T. P. Tang, "Table-driven implementation of the Logarithm function for IEEE floating point arithmetic", in *ACM Trans. Math. Software*, Vol. 16 No. 4, Dec. 1990, pp 379–400.

[Ta 89] P. T. P. Tang, "Table-driven implementation of the Exponential function for IEEE floating point arithmetic", in *ACM Trans. Math. Software*, Vol. 15, No. 2, June 1989, pp 144–157.

[WF 91] D. C. Wong and M. J. Flynn, "Fast Division Using Accurate Quotient Approximations to Reduce the Number of Iterations", in *Proc. 10th IEEE Symp. Comput. Arithmetic*, 1991, pp 191–201.

SUMMRY

An object of the invention is to provide a design methodology for compressing the size of function tables, such as seed reciprocal tables used in multiplicative division. Another object is to provide a faithful function table lookup methodology to provide output guaranteed to one ulp accuracy in the final result.

This and other objects of the invention are achieved by a bipartite table compression methodology. In one aspect of the invention, the bipartite table compression technique is used in implementing a bipartite lookup table unit in an arithmetic processor in which function computation uses a lookup table to obtain a function output value.

The bipartite lookup table unit receives a table input index to a bipartite lookup table that includes first and second component tables. The table input index is characterized by (a) a first component index, formed by a first subset of the input table index, which indexes the first component table, and (b) a second component index, formed by a second subset of the input table index, which indexes the second component table.

In response to the table input index, i.e., the first and second component indices, the first component table outputs a first component, and the second component table outputs a second component. The first and second components form a redundant output from the bipartite lookup table, providing the function output value.

In an exemplary implementation, the input table index is characterized by a high order part $X_h$ of $k_1$ bits, a middle order part $X_m$ of $k_2$ bits, and a low order part $x_1$ of $k_3$ bits, where $k_1$, $k_2$, and $k_3$ are comparable in size. The first component index is $[X_h|X_m]$ which indexes $2^{k_1+k_2}$ entries in the first component table, and the second component index is $[X_h|X_l]$ which indexes $2^{k_1+k_3}$ entries in the second component table. The number of bits in the first component table output is substantially $k_1+k_2+k_3$ bits, while the number of bits in the second component table output is substantially $k_3$ bits.

In another aspect of the invention, the first and second components are fused with rounding to yield a function value that is faithful in that the function value is accurate to one ulp (unit in the last place). In another aspect of the invention, the first and second components are fused with rounding to yield a function value that is optimal in that, for each function value obtained, the maximum relative error is the minimum possible.

In another aspect of the invention, the bipartite table lookup unit is used in combination with a multiplier with a Booth recoder. The redundant output from the bipartite table unit is input directly to the Booth recoder, such that the Booth recoder performs a fusion of the first and second component outputs. In an exemplary implementation, the redundant output is in borrow-save format such that first component output from the first component table is a borrow/positive value, and the second component output from the second component table is a save/negative value.

Embodiments of the invention may be implemented to realize one or more of the following technical advantages. As applied to reciprocal tables used in multiplicative division, the bipartite table compression technique yields accurate seed reciprocals with a compression factor that increases rapidly as the size of the reciprocal output increases (2 to 16 times smaller than conventional 5–16 bit reciprocal tables), making possible the use of larger seed reciprocals than previously considered cost effective in hardware. The P and N component tables of the bipartite reciprocal table are accessed in parallel to obtain the positive and negative components of a redundant borrow-save seed reciprocal value. Fusion of the redundant reciprocal components includes a rounding, so the output reciprocals are guaranteed to be faithful (i.e., correct to one ulp), and typically provide a round-to-nearest (correct to one-half ulp) reciprocal for over 90% of input arguments.

The redundant value output from the bipartite table can be fed directly to a multiplier recoder, avoiding any significant cost in logic complexity or execution time compared to lookup of conventional binary values. Alternatively, the redundant reciprocal output can be fused (converted to a corresponding binary number) prior to input to the multiplier—although the converted value can be routed over narrower data paths and requires somewhat simpler logic for a subsequent operation (such as recoding), these advantages of conversion do not always justify the cost of the conversion. An advantage of bipartite versus conventional lookup tables is the opportunity to trade-off the expensive conversion step.

The compression technique exploits the mathematical properties of the reciprocal function, and is independent of the logic minimization which can be applied on the compressed tables to further minimize the size of the table or the equivalent PLA. Furthermore, a multiplicative interpolation technique can be combined with the bipartite reciprocal table methodology to achieve further compression with an added hardware cost of a small multiplier.

A midpoint reciprocal algorithm is used to minimize, for a conventional reciprocal table, the relative error of each table entry—establishing the necessary size of a conventional table provides a benchmark for comparing the improvements obtained by the bipartite table compression technique. In addition, the midpoint reciprocal algorithm facilitates constructing minimum sized bipartite reciprocal tables that are faithful (i.e., guaranteed one ulp accuracy), with the collateral benefit of maximizing the percentage of input values obtaining round-to-nearest reciprocal output (correct within one-half ulp) for tables with last bit accuracy. Further methodology associated with the midpoint reciprocal algorithm requires generation and inspection of only a small portion of a table to identify input table values guaranteed to include the worst case relative errors in the table.

The bipartite table compression techniques described in conjunction with seed reciprocal tables can be extended to provide table compression techniques for other functions, such as root reciprocal, logarithm, and exponential, that have a relatively smooth change in slope. For these other functions, procedures can be employed to determine each entry in a conventional lookup table so as to minimize the maximum relative error for each entry. These values are then useful as a basis with which to compare the output of a compressed bipartite table for the same function.

For a more complete understanding of the invention, and for further features and advantages, reference is now made to the Detailed Description of an exemplary embodiment of the invention, together with the accompanying Drawings, it being understood that the invention encompasses any modifications or alternative embodiments that fall within the scope of the claims.

DRAWINGS

FIG. 1 illustrates the exemplary bipartite reciprocal unit including P and N component tables providing a redundant output according to aspects of the invention.

FIGS. 2a, 2b, and 2c illustrate the bipartite compression technique for constructing an exemplary bipartite reciprocal table according to aspects of the invention, including characterizing a reciprocal curve in terms of blocks, overlay segments for each block, and shift correction for each overlay segment to determine a representative reciprocal segment for use throughout that block.

DETAILED DESCRIPTION

Figure 3A:
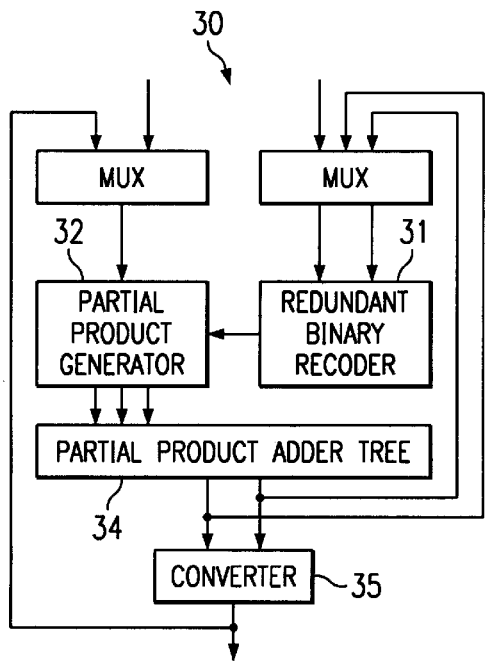
FIG. 3a illustrates a conventional multiplier augmented by a redundant binary Booth recoding.

The detailed description of an exemplary embodiment of the bipartite table compression technique is organized as follows:

1. Bipartite Table Compression
   1.1. Optimal Conventional Table
   1.2. Faithful Bipartite Table
      1.2.1. Custom Optimal/Faithful
      1.2.2. Custom Faithful
      1.2.3. Construction Algorithm
2. Bipartite Reciprocal Unit
   2.1. Redundant Input To Recoder
   2.2. Conversion To Non-Redundant
3. Alternative Bipartite Function Units
4. Conclusion Appendix Table 1—(5,4) Optimal Reciprocal Table Appendix Tables 2A/2B—(6,5) Optimal/Faithful Bipartite Reciprocal Table Appendix Tables 3A/3B—(7,6) Optimal/Faithful Bipartite Reciprocal Table Appendix Tables 4A/4B—(8,7) Optimal/Faithful Bipartite Reciprocal Table Appendix Tables 5A/5B/5C—Faithful Bipartite Reciprocal Table Appendix Table 6—Portion of (10,8) Faithful Bipartite Reciprocal Table Appendix A—Das Sarma and Matula, "Faithful Bipartite ROM Reciprocal Tables", Proceedings Paper, 1995

Appendix B—Das Sarma and Matula, "Faithful Bipartite ROM Reciprocal Tables", SMU Technical Report, 1995

Appendix C—Das Sarma, "Highly Accurate Initial Reciprocal Approximations For High Performance Division Algorithms", Ph. D. thesis, SMU, 1995

Appendix D—Lyu and Matula, "Redundant Binary Booth Recoding", Proceedings Paper, 1995 This organizational outline, and the corresponding headings, are used in this Detailed Description for convenience of reference only.

The bipartite table compression technique is used in the design of an exemplary bipartite reciprocal unit for mulitplicative division —in accordance with aspects of the invention, the bipartite reciprocal unit provides a redundant faithful reciprocal output for direct input to the Booth recoder of a multiplier. Detailed descriptions of conventional or known aspects of multiplicative division implementations, including conventional multiplicative division algorithms, are omitted so as to not obscure the description of the invention.

A redundant value or redundant binary representation has an extended digit range for each digit, such as {−1, 0, +1} or {0, 1, 2}. Furthermore, each digit has several known alternative encodings, each with two components, such as sign/magnitude, positive/negative (borrow-save), or carry/sum (carry-save). A redundant value can be converted to the corresponding binary number, such as by adding (with full carry ripple) the redundant components.

1. Bipartite Table Compression

The exemplary bipartite reciprocal unit designed in accordance with the bipartite table compression technique of the invention uses a bipartite reciprocal table with two separately indexed seed reciprocal look-up tables to provide respective components of a faithful reciprocal output in the redundant borrow-save format. The bipartite reciprocal table achieves significant table compression relative to an optimally sized conventional reciprocal look-up table (2 to 16 times smaller than conventional 5–16 bit reciprocal tables) —the bipartite compression technique in effect uses a transparent form of interpolation to achieve compression without any multiplications or additions.

FIG. 1 illustrates the exemplary bipartite reciprocal unit 10. The design of the bipartite reciprocal unit is further described in Section 2—in general it includes a bipartite reciprocal table 12 composed of positive component P and negative component N Tables. An input reciprocal table index 14 comprises a selected number of the leading bits (following the leading unit bit) of an arbitrary length normalized divisor argument (such as IEEE double extended) —in accordance with aspects of the invention, the reciprocal table index is partitioned into substantially equal high, middle, and low order parts xh, xm, and xl.

The positive component P Table is indexed with the high and middle order parts $[X_h|X_m]$, while the negative component N Table is indexed with the high and low order parts $[X_h|X_1]$. The P and N Tables together provide a reciprocal output in redundant borrow-save format, with the P Table providing a positive component output substantially corresponding in length to the input argument $[X_h|X_m]$ (i.e., with more bits that its index $[X_h|X_m]$), and the N table providing a negative (borrows) component output substantially corresponding in length to the lower order part $[X_1]$ of its index $[X_h|X_1]$. The length of output of the P and N Tables may include further "guard bits" as appropriate for selected functions.

Thus, if $X_h$ has $k_1$ bits, $X_m$ has $k_2$ bits, and $X_1$ has $k_3$ bits, then the P Table has $2^{k_1+k_2}$ entries of width substantially $k_1+k_2+k_3$ bits, and the N Table has substantially $2^{k_1+k_3}$ entries of width substantially $k_3$ bits.

According to one aspect of the invention, the redundant borrow-save reciprocal output from the component P and N tables is input directly to the Booth recoder of a multiplier to provide for subsequent multiplication of the divisor and/or dividend.

According to other aspects of the invention, the bipartite compression technique is used to construct a bipartite reciprocal table 12 that is faithful in that it is guaranteed to be correct to one ulp, i.e. it provides less than one ulp deviation from the infinitely precise reciprocal of the infinitely precise input argument. In addition, for reciprocal output values of less than 7 bits, the bipartite compression technique allows for a faithful reciprocal output that is also optimal (see, Section 1.2.1). Moreover, the bipartite reciprocal output is round-to-nearest for over 90% of arbitrarily long input arguments.

1.1. Optimal Conventional Table

An optimal conventional reciprocal table is used to provide a specific benchmark for evaluating compression factors achievable from an exemplary bipartite reciprocal table constructed in accordance with the bipartite compression technique.

An i-bits-in, j-bits-out bipartite reciprocal table is optimal if it provides identical results to that given by an i-bits-in, j-bits-out optimal conventional reciprocal table. The ratio of the size of the optimal conventional reciprocal table to the size of the optimal bipartite reciprocal table will be termed the compression factor for the optimal bipartite reciprocal table.

Note that although the size of the bipartite reciprocal table (i.e., the combined sizes of the component P and N tables) is not fixed by the numbers of input and output bits, the size of the optimal conventional reciprocal table is always $2^i \times j$ bits, so that the compression factor is simply determined from the parameters giving the component P and N table sizes of the bipartite reciprocal table.

A faithful conventional reciprocal table denotes an i-bits-in, j-bits-out reciprocal table such that for any input argument $1 \leq x \neq < 2$, the output differs from $1/x$ by less than one ulp. For such tables, allowable reciprocal output values include unity, as well as the $2^j$ values of the form $0.1b_1b_2...b_j$. Note that for any j-bits-in, j-bits-out reciprocal table with $j \geq 3$, the maximum ulp error is strictly greater than one ulp because the second smallest input interval $[(2_j+1)/2^j, (2^j+2)/2_j)$ has an interval of reciprocal values extending from less than $(2^{j+1}-3)(2^{j+1}-2)$ to greater than $(2^{j+1})$.

Thus, any i-bits-in, j-bits-out reciprocal table for $i \leq j$ with $j > 3$ has a maximum error in ulps strictly greater than one ulp and therefore is not faithful.

Accordingly, a faithful reciprocal table must be limited to (j+g)-bits-in, j-bits-out where $g \geq 1$ is termed the number of input guard bits. For the purposes of this description of the design of an exemplary bipartite reciprocal table, a faithful and optimal conventional reciprocal table can be constructed in accordance with the midpoint reciprocal algorithm described in [DM 94]: Stimulus: Integers $i \geq 1$ and $j \geq 1$ Response: An i-bits-in j-bits-out reciprocal table Method:

For $n=2^i$ to $2^{i+1}-1$<for each input interval $[n/2^i, (n+1)/2^i)$>L1: table(n) := $RN[(2^{i+j+1}/(n+(\frac{1}{2}))]$ <rounding is to the nearest integer in ulps>The midpoint reciprocal algorithm generates an optimal (i,j) conventional reciprocal table, i.e., the maximum relative error for each entry in the table is the minimum possible for that entry.

Specifically, for $j \geq 1$, $g \geq 0$, an optimal reciprocal table is faithful for any $g \geq 1$, and in general has a maximum error for any output strictly less than $(\frac{1}{2})+2^{-g}$ ulps for any $g \geq 0$. Thus, the minimum optimal size of any faithful conventional reciprocal table is $2^{j+1} \times j$ bits, as occurs for the optimal (j+1, j) reciprocal table.

Appendix Table 1 illustrates an optimal 5-bits-in, 4-bits-out reciprocal table that generalizes to observations about (j+g, j) optimal tables. For each input interval in Appendix Table 1, the output error interval is given in ulps, confirming that the (5,4) optimal table is faithful with the maximum error 0.970 ulps occurring for inputs approaching $^{33}/_{32}$ in input interval [$^{32}/_{32}$, $^{33}/_{32}$).

Maximizing the percentage of inputs for which rounded to nearest outputs are obtained is a useful "tiebreaking" refinement of faithfulness [DM 95]. Such a max RN conventional reciprocal table is an i-bits-in, j-bits-out reciprocal table for which the portion of input values $1 \leq <2$ obtaining round-to-nearest output is as large as possible over all i-bits-in, j-bits-out reciprocal tables. Specifically, for any $g \geq 1$, $j \geq 1$, an optimal (j+g, j) reciprocal table is a max RN table, where the portion not rounded-to-nearest is at most $1/(2^{g+1})$. To the extent that the non-zero round-to-nearest percentages of the max RN table input intervals are uniformly distributed between 0 and 50%, the portion of the input $1 \leq <2$ not rounded to nearest for a max RN (j+g, j) reciprocal table should be $1/(2^{g+2})$.

Using the conventional faithful reciprocal table (j+g, j) with minimum size as a standard metric, an exemplary bipartite reciprocal table that is both optimal and faithful can be evaluated in terms of compression factor.

1.2. Faithful Bipartite Table

The bipartite compression technique involves two approaches to designing a faithful bipartite (j+g-bits-in, j-bits-out) reciprocal table of size $2^{j+g}$ j bits. For exemplary faithful bipartite reciprocal tables of up to 9-bits-out, a custom approach using only one input guard bit, that is (j+1)-bits-in for j-bits-out is provided. For exemplary faithful bipartite reciprocal tables larger than 9-bits-out, a generic bipartite table construction algorithm requiring two input guard bits, that is (+2)-bits-in for j-bits-out, is recommended.

The custom approach achieves a faithful bipartite reciprocal table design that is also optimal for j=5, 6, 7 in that it corresponds term-by-term with a minimum-sized faithful conventional reciprocal table as defined in Section 1.1 —(j+1)-bits-in, j-bits-out of size $2^{i+1}$ j bits (see, Section 1.2.1). For j=8, 9, the custom approach achieves a faithful bipartite reciprocal table design that requires only the minimum j+1 input bits, but is not strictly optimal in that minor discrepancies exist between the bipartite table and the corresponding optimal conventional reciprocal table (see, Section 1.2.2). The stronger condition of optimality is reserved for those bipartite tables where the expanded results obtainable from the component P and N Tables agrees for ever entry with a conventional reciprocal table in which the maximum relative error has been minimized for each entry.

For larger values of j, the bipartite table construction algorithm provides faithful bipartite reciprocal tables according to (j+2)-bits-in, j-bits-out -- while such a bipartite table is not optimal, it is faithful and achieves a significant compression factor (see, Section 1.2.3). In effect, specifying an extra input bit provides the necessary margin to enable bipartite reciprocal tables to be constructed according to a non-custom generic algorithmic procedure that can be shown to guarantee a faithful reciprocal output.

1.2.1. Custom Optimal/Faithful

Customized bipartite reciprocal tables that are optimal in addition to being faithful are given in Appendix Tables 2A/2B, 3A/3B, 4A/4B for the small but non-trivial values j=5, 6, 7. These customized optimal bipartite tables achieve compression factors around 2-to-1 for a compression ratio of around 50%.

The optimality condition for these bipartite reciprocal tables means they agree term-by-term with the conventional table that would be generated by the midpoint reciprocal algorithm. Thus, in effect, the compression obtained is lossless.

Table 1 gives the input bit partition, positive and negative component table dimensions, table sizes, and compression factors for the custom optimal bipartite reciprocal tables given in Appendix Tables 2A/2B, 3A/3B, 4A/4B.

TABLE 1

| Output Bits j | Input bit Partition of j + 1 | Positive Component Table Dimension | Negative Component Table Dimension | Total Table Size in Bytes | Compression Factor |
|---|---|---|---|---|---|
| 5 | 2,2,2 | 4 in,7 out | 4 in,4 out | 22 | 1.82 |
| 6 | 3,2,2 | 5 in,8 out | 5 in,4 out | 48 | 2.00 |
| 7 | 3,3,2 | 6 in,9 out | 5 in,4 out | 88 | 2.55 |

Referring to FIG. 1, and to Appendix Table 2A which gives the positive and negative components of a 6-bits-in, 5-bits-out optimal bipartite reciprocal table 12, consider a 6-bit input operand $1.b_5b_4b_3b_2b_1b_0$. The input operand is partitioned into three parts, each having two bits: (a) a high order part $X_h=b_5b_4$, (b) a middle order part $X_m=b_3b_2$, and (c) a low order part $X_1=b_1b_0$. The positive P Table [4 bits-in, 7 bits-out] is indexed with the high and middle order parts $[x_h |x_m]$, while the negative N Table [4 bits-in, 4 bits-out] is indexed with the high and low order parts $[X_h|X_1]$.

Given any 6 bit input operand, the P and N Tables are looked up for the positive and negative components of the redundant binary reciprocal given in borrow-save form. Two guard bits in each of the P and N outputs are rounded off during fusion, which in the exemplary bipartite reciprocal unit occurs in a multiplier recoder—the resulting output is identical to the optimal conventional reciprocal table output.

For convenience of illustration, the outputs of the P and N Tables are each shown with 10 bits, a leading bit before the radix point followed by 9 bits beyond the radix point. However only 7 bits and 4 bits respectively need to be stored in the P and N Tables. Note that, for the P Table positive component of the reciprocal output, the leading bits denote that the reciprocal must lie between ½ and 1 —the trailing bit shown is added implicitly when the P and N component values are fused, and is not a part of the bits stored in the P Table. Similarly for the N Table negative component of the reciprocal output, the first 4 zero bits beyond the radix point and the trailing 0 bit are shown only for visualizing alignment in fusing the N Table component value with the corresponding P Table component value.

Appendix Table 2B illustrates an expansion of the 6-bits-in, 5-bits-out optimal bipartite table shown in Appendix Table 2A. For each 6-bit input, the corresponding infinite precision middle point reciprocal and the optimal reciprocal (rounded middle point reciprocal) are provided. To achieve optimality the P and N Table entries are constructed such that the computed reciprocal output for any 6-bit input obtained from the corresponding P and N values is not only close to but on the same side of the output value midpoint in ulps as the corresponding infinite precision middle point reciprocal.

Note that the full (6,5) bit bipartite reciprocal table (P and N component tables) can be divided into 4 blocks, each with 4 segments, each with 4 entries. Specifically, the number of blocks is determined by the number $k_1$ of bits in the high order part of the input $X_h$, the number of segments per block is determined by the number $k_2$ of bits in the middle order part of the input $x_m$, and the number of entries per segment is determined by the number $k_3$ of low order bits in the input $X_1$. Note also that, for each segment of the (6,5) bipartite table, there is (a) one P Table entry since the leading 4 bits of the 6 bit input in the segment are the same, and (b) four different N Table entries corresponding to the four inputs in each segment having different low order bits. Note also that in each block, the same set of four N Table entries occur in each of the four segments. Thus, given a 6-bit input operand, (a) the two high order input bits $X_h$ in conjunction with the two middle order input bits $x_m$ identify the block and the segment it belongs to, indexing to the corresponding positive component entry in the P Table, and (b) the two high and two low order input bits $[X_h|X_1]$ index to the appropriate N Table entry for the designated segment. In effect, the low order input bits provide an interpolation index (without requiring the additional multiplication or addition associated with conventional interpolation).

By way of example, consider line seven of Appendix Table 2A, which corresponds to the input 1.000110 shown as 70 ulps where an ulp is 1/64. This input is the third entry of the second segment in the first block. The corresponding P Table is indexed by 1.0001XX, and its output is shown in line five to be 59.875 ulps. Table N is indexed by 1.00XXX10, and its output is in line seven as 1.75 ulps. The computed value of the reciprocal is obtained as (59.875−1.75)=58.125 ulps and then finally rounded to nearest to yield 58 ulps as the 5-bit reciprocal of the 6-bit input 70/64.

Note that for any input argument, the rounded computed reciprocal is identical to the rounded midpoint reciprocal from the conventional 64 entry table. Thus, this 6-bits-in, 5-bits-out bipartite reciprocal table with (4,7) and (4,4) component P and N Tables for positive and negative components is optimal (and hence faithful).

Finally, note that the exemplary bipartite reciprocal table illustrated in Appendix Table 2B incorporates the simplification that the positive and negative components need not be subjected to a carry completion addition, but rather can go directly to a multiplier (Booth) recoder accepting borrow-save form with the recoding including the rounding. As a result, compression is obtained with very little penalty in hardware complexity or cycle time when the reciprocal is to be employed as a multiplier, such as in the fast division algorithms previously cited.

Appendix Tables 3A/3B give the positive and negative components of a 7-bits-in, 6-bits-out optimal bipartite reciprocal table. Appendix Tables 4A/4B give the positive and negative components of a 7-bits-in, 6-bits-out optimal bipartite reciprocal table.

In general, for values of j greater that 7 bits it is not feasible to construct optimal, (j+1)-bits-in, j-bits-out bipartite reciprocal tables (for lossless compression) where the index size of both tables is only about (2/3) j. For larger values of j, the focus of the bipartite compression technique is on constructing bipartite reciprocal tables that are faithful (guaranteed correct to one ulp), even though they might not match identically the optimal (j+1)-bits-in, j-bits-out conventional reciprocal tables. Any differences correspond to the situation where either the same round-up or round-down output value would provide a one ulp bound for any input argument used to provide a corresponding input reciprocal table index.

For j=8, 9, the custom approach is still used to achieve a faithful bipartite reciprocal table that requires only j+1 input bits. That is, the custom approach is used to achieve a faithful bipartite reciprocal table design that requires only j+1 input bits, but is not strictly optimal in that minor discrepancies exist between the bipartite table and the corresponding optimal conventional reciprocal table. The compression factors are more than 4-to-1.

For j=8, Appendix Tables 5A/5B illustrate the positive and negative components of a customized (j+1)-bits-in, j-bits-out bipartite reciprocal table that is faithful. A 10-bits-in, 9-bits-out bipartite reciprocal table is not included as an appendix for brevity.

Table 2 gives the input bit partition, positive and negative component table dimensions, table sizes, and compression factors for custom faithful bipartite reciprocal tables with j=8, 9.

TABLE 2

| Output Bits j | Input bit Partition of j + 1 | Positive Component Table Dimension | Negative Component Table Dimension | Total Table Size in Bytes | Compression Factor |
|---|---|---|---|---|---|
| 8 | 3,3,3 | 6 in,10 out | 6 in,5 out | 120 | 4.27 |
| 9 | 4,3,3 | 7 in,11 out | 7 in,5 out | 256 | 4.50 |

Note that if an input interval of arguments $[n/2^i, (n+1)/2^i)$ is such that the interval of reciprocals falls strictly between the two output values of m ulps and m+1 ulps, then either choice is an acceptable faithful reciprocal. In this case, the optimal choice is the unique one that maximizes the portion of the interval that rounds to nearest, even though the split may be near half and half.

When generating a bipartite reciprocal table accurate to a unit in the last place, the extent to which it differs from the corresponding optimal conventional reciprocal table may be measured by comparing either or both the maximum ulp error of each table and the portions of input that realize round-to-nearest lookup in each table. An i-bits-in, j-bits-out bipartite reciprocal table has been termed faithful when the i-bit input corresponding to any input argument $1 \leq < 2$ provides a j bit output that differs by less than one ulp from the infinitely precise value 1/x. The compression factor for any faithful bipartite reciprocal table is given by $2^{j+1}$ j divided by the size of the i-bits-in, j-bits-out faithful bipartite reciprocal table. Note that this compression factor is not for exclusively lossless (i.e., optimal) compression, but is particular for compression preserving the one ulp bound. Note also that the compression factor is defined in comparison to the size of the (j+1)-bits-in, j-bits-out optimal conventional reciprocal table (which from Section 1.1 is the smallest reciprocal table satisfying the one ulp bound).

Faithful compression actually allows for greater possibilities in reducing table size than would pertain to the requirement of lossless compression. In particular, custom faithful bipartite reciprocal tables for the practically useful sizes 9-bits-in, 8-bits-out and 10-bits-in, 9-bits-out both attain compression factors of better than 4 to 1.

The Appendix Tables 5A/5B for the 9-bits-in, 8-bits-out bipartite reciprocal table may be exhaustively developed to verify faithfulness in a manner comparable to the expansion provided in Appendix Table 2B for the 6-bits-in, 5-bits-out bipartite table. Appendix Table 5C illustrates a typical line of such an expansion where the faithful bipartite table differs from the optimal reciprocal table, as for example for the input 1.000100001=545/512. Note that in Appendix Table 5C the successive low end reciprocals 480.998/512 and 480.117/512 indicate that any point in the input interval having input index 1.000100001 may have its reciprocal represented with less than one ulp error by either 480/512 or 481/512. The optimal table choice is 481/512 with maximum ulp error for this interval of 0.883 ulp where 56.5% of input values from this interval will obtain a round-to-nearest table lookup reciprocal value. Alternatively, the faithful bipartite table choice is 480/512 with maximum ulp error for this interval of 0.998 ulp where the other complimentary 43.5% of the input values from this input interval will obtain a round-to-nearest table lookup reciprocal value.

Based on an exhaustive expansion, both faithful bipartite and conventional optimal tables realize the same worst case ulp difference of 0.99805 realized for the input 1.0000000001. The more useful metric here is that the faithful bipartite table realizes round-to-nearest output for some 82% of all inputs over 1<<2, as compared to some 88% for the optimal reciprocal table. Thus, the bipartite table exhibits a slightly poorer average case performance with equal worst case rounding error in ulps, while achieving a more than 4 to 1 compression in table size.

An instructive comparison is between the enhanced accuracy documented in the 120 byte 9-bits-in, 8-bits-out faithful bipartite reciprocal table in comparison to the nearly equivalent size 128 byte 7-bits-in, 8-bits-out optimal conventional reciprocal table. While the latter achieves a maximum relative error bound of 7.775 bits [DM 94], it provides a faithful 8 bit result for only 85.82% of all input compared to 100% for the bipartite table, and it provides a round-to-nearest result for only 52.33% of all input compared to some 82% for the faithful bipartite table. The custom approach to constructing a (j+1, j) faithful bipartite reciprocal table for j=8, 9 relies on avoiding compounded worst case features. This custom approach is tractable for less than 10 output bits—for $j \geq 10$ with near ($2/3$) j table index sizes, this approach becomes problematic.

1.2.3. Bipartite Construction Algorithm

For faithful bipartite reciprocal tables of 10 or more output bits, the bipartite compression technique uses an algorithmic construction approach to generate (j+2)-bits-in, j-bits-out faithful bipartite tables. While such a bipartite table is not optimal, specifying an extra input bit provides the necessary margin to enable bipartite reciprocal tables to be constructed for larger values of j than can be feasibly attempted with the custom (j+1)-bits-in approach.

Referring to FIG. 1, the parameterization of the positive P and negative N component Tables separates into three cases of the input argument 14 $[x_h|x_m|x_1]$ based on the value of j modulo 3. It is convenient to introduce the parameter $k=\lfloor j/3 \rfloor$, and view the cases cyclically for the three values j=3k−2, 3k−1, and 3k.

The positive component P Table increases in size with j periodically by factors of approximately 2, 2, and 1, while the negative component N Table remains the same size for three consecutive values of j and then jumps by a factor somewhat over four.

Table 3 illustrates this parameterization:

TABLE 3

| Output Bits j | Input Bit Partition of j + 2 | Positive component Table Dimension | Negative component Table Dimension | Total Table Size in Bytes |
|---|---|---|---|---|
| 3k − 2 | k + 1,k − 1,k | 2k in,3k out | 2k + 1 in, k + 1 out | $2^{2k}$ (5k + 2) |

TABLE 3-continued

| Output Bits j | Input Bit Partition of j + 2 | Positive component Table Dimension | Negative component Table Dimension | Total Table Size in Bytes |
|---|---|---|---|---|
| 3k − 1 | k + 1,k,k | 2k + 1 in, 3k + 1 out | 2k + 1 in, k + 1 out | $2^{2k}$ (8k + 4) |
| 3k | k + 1,k + 1,k | 2k + 2 in, 3k + 2 out | 2k + 1 in, k + 1 out | $2^{2k}$ (14k + 10) |

The combined effect is that asymptotically in j the total table size grows periodically by factors 8/5=1.60, 7/4=1.75, and 10/7=1.43, for a rate asymptotically averaging 4/3=1.587. Thus generating 3 more bits with one ulp accuracy is obtained at a cost of a factor 4 growth in bipartite reciprocal table size as compared to the larger factor 8 growth in size of a conventional optimal reciprocal table.

FIG. 1 illustrates the input bit partitions, indexing schemes, and dimensions of the P and N Tables to construct a (3k+1)-bits-in, (3k−1)-bits-out bipartite reciprocal table (i.e., (j+2)-bits-in, j-bits-out).

Appendix Table 6 illustrates a portion of a 10-bits-in, 8-bits-out bipartite reciprocal table, which contains the reciprocals and errors incurred for selected entries in the first block of a full table. This Table illustrates the bipartite compression technique, and in particular the construction of the positive P and negative N Table components of a bipartite reciprocal table 12 —in particular, this Table includes low and middle point reciprocals—the middle point reciprocal is required for determining the conventional optimal table values, while the successive low point reciprocals define the interval of input values associated with a given table entry.

For an exemplary bipartite reciprocal table, the 10 input bits are split into $[x_h|x_m|x_1]$ with bit lengths [4, 3, 3] as per a prameterization corresponding to $k=\lfloor 8/3 \rfloor=3$ and j=8=3× 3−1=3k−1.

The leading 7 bits $[x_h|x_m]$ index to the P Table, and the high order 4 bits in conjunction with low order 3 bits $[x_h|x_1]$ index into the N Table.

To reflect this parameterization, a full 10 bits in, 8 bits out reciprocal table would be partitioned into $2^{k+1}=16$ blocks, each block containing $2^k=8$ segments, and each segment containing $2^k=8$ entries. Appendix Table 6 contains selected inputs relevant to the construction of the first block, including all 8 entries in the first and last segment and the first and last entries of each of the 6 other segments.

For each of the 10 bit inputs shown, the low end point reciprocal and middle point reciprocal are each given to three decimal fraction digits of ulps, implicitly indicating the analytic infinitely precise values for this part of the computation.

Note that each segment requires one P Table entry, and each block requires a set of eight N Table entries that are repeated for each segment in the block. For any method of computing the P Table and N Table entries, the entries for different blocks are independently computed since the high order four input bits are different for each block. It is representative to show the computation of P and N entries in the first block.

The infinite precision values providing the basis for the P and N Table entries are computed as follows. The middle point reciprocal and the P and N table entries are considered to be infinite precision values unless mentioned otherwise.

Selected middle point reciprocals are used to construct the (10,8) bipartite reciprocal table. The entries in the bipartite table are selected such that the computed reciprocal of each input (the difference of presumed infinitely precise P and N entries) differs by no more than 1/8 ulp from the corresponding middle point reciprocal—such resulting differences are enumerated for reference in the Appendix Table 6.

Note that each middle point reciprocal differs from each of the corresponding low (interval) end point reciprocals by at most 1/4 ulps, this amount decreasing monotonically down the table from the initial value 0.250 ulps to 0.222 ulps at the end of the first block. As a result, the middle point reciprocal differs from any input argument reciprocal 1/x by at most 1/4 ulp, so that the computed reciprocal as determined from the P and N Table entries differs from 1/x by at most 1/4+1/8=3/8 ulps. This guarantee of at most 3/8 ulp error in the computed reciprocals is instrumental in insuring that the subsequent compound roundings producing the P and N Table reciprocal component output values achieves a total error bound strictly less than one ulp.

The spread of a segment is defined to be the difference between the middle point reciprocals of the first and last inputs in the segment. For the first segment in the Appendix Table 6 the spread is 511.750–508.277=3.473 ulps, and the spreads of the next seven segments are 3.419 ulps, 3.367 ulps, 3.316 ulps, 3.266 ulps, 3.217 ulps, 3.170 ulps, and 3.123 ulps.

FIGS. 2a, 2b, and 2c illustrate the bipartite compression technique for constructing bipartite reciprocal tables, including characterizing a reciprocal curve 20 in terms of blocks, overlay segments for each block, and the associated shift correction values for each overlay segment contained in the N Table.

Specifically, FIG. 2a illustrates a Block i for the reciprocal curve 20 divided into four segments 1–4, with each segment decreasing monotonically. FIG. 2b shows these segments overlayed to illustrate the relative difference of the slopes and the spreads of the segments.

FIG. 2c illustrates the bipartite compression technique used to obtain a tight fit of the curve resulting from the P and N Table values. Specifically, the spreads and the slopes of the first and last segments of a block are averaged to generate the dotted curve 22. The low (first segment) and high (last segment) overlays of the block are shifted down and up respectively by an amount b such that the spread of the dotted curve is the average of the spreads of the first and the last segments. The other overlays (not shown in the figure for clarity) are shifted accordingly. Thus, the first entry of each segment is adjusted accordingly to compute the P Table entries to cover the spread.

Note that in the Appendix Table 6, the computed spread is 3.298 ulps which is the average of the spreads of the first and last segments. Also note that the middle point reciprocal of the first entry of the first segment is pushed down by (3.473–3.123)/2 (or 0.175) ulps to obtain the P Table entry of the first segment. Similarly the middle point reciprocal of the first entry of the last segment is pushed up by 0.175 ulp to obtain the P Table entry of the last segment.

To compute the remaining P Table entries, note that corresponding middle point reciprocals need to be adjusted by 0.087 ulps, 0.061 ulps, 0.035 ulps, 0.009 ulps, 0.016 ulps, 0.040 ulps, 0.064 ulps, and 0.087 ulps. The P Table entries of the eight segments are computed as 511.663/512, 507.724/512, 503.846/512, 500.027/512, 496.266/512, 492.561/512, 488.911/512, and 485.911/512.

The N Table entries of the Block i are computed using the value of the dotted curve 22, which at each point is the average of the slopes of the high and low overlays at that point. Thus, the successive differences of the entries of the first and last segments of the first block shown in Appendix Table 6 are averaged to compute the N Table entries, centering the errors across each segment and the errors of each segments across each block.

The first N Table entry of each segment is zero. For i>1, the $i^{th}$ N Table entry of the block is computed as the average difference between the middle point reciprocals of the first input and the $i^{th}$ input of the first and last segments. In the Appendix Table 6 for the first block, the first N Table entry is 0, the second N Table entry is $$\frac{(511.75 - 510.753) + (485.227 - 484.779)}{2}$$

(or 0.474) ulps, and the entry is $$\frac{(511.75 - 510.753) + (485.227 - 484.331)}{2}$$

(or 0.974) ulps. Similarly, the remaining five N Table entries are 1.419 ulps, 1.890 ulps, 2.060 ulps, 2.830 ulps, and 3.298 ulps.

With these eight P Table entries, and eight N Table entries, the reciprocals of the first sixty-four 10-bit inputs are computed and shown in the sixth column of Appendix Table 6. The last column of this Table shows the signed differences in ulps between the computed reciprocals and the corresponding middle point reciprocals of each 10 bit input in the first block.

Note that these differences in each segment are symmetric and centered around zero, and their magnitudes are maximum for the first and last entries of the segment. Also note that the maximum difference in each block is centered around zero and is realized in the first and last segments of the block.

These P and N Table values are infinite precision values and are each subjected to rounding before being stored in the bipartite table. Each P Table entry is rounded down to 10 bits, the two trailing bits being the guard bits. Each N Table entry is rounded-to-nearest to 4 bits. Note that the value of a spread of any segment in Appendix Table 6 is strictly less than 4 ulps, so only 2 bits are needed to the left of the radix point in ulps to cover any spread, and so only 4 bits need to be stored in the N Table, the two trailing bits being the guard bits.

For the first block of the (10,8) bipartite table in Appendix Table 6 the P Table entries are obtained by rounding the infinitely precise values down to the closest quarter and adding 1/8, effectively rounding to the nearest odd eighth. The resulting values with the 1/8 included are then 511.625, 507.625, 503.875, 500.125, 496.375, 492.625, 488.875, and 485.375. The N Table entries are obtained by rounding to the nearest quarter yielding 0, 0.50, 1.00, 1.50, 2.00, 2.25, 2.75, and 3.25.

Note that since the computed prerounded reciprocal obtained by fusing the P and N components will have an odd number of eighth's of ulps, the final rounding adds at most 3/8 ulp additional error. The compounded worst case additional error due to these discretizing roundings is 5/8 ulps.

The rounded P and N Table values for the input 1027/1024 in line are 511.50/1024 and 1.5/1024 which constitute the positive component and the negative component of the redundant reciprocal in borrow-save form. The final non-redundant 8 bit reciprocal of the 10 bit input 1027/1024 is computed by fusing the positive component (511.625/1024)

with the negative component (1.5/1024) and rounding to the nearest ulp to yield an 8 bit value (510/1024) matching the optimal reciprocal table entry for this input operand.

For any 10 bit input operand in the (10,8) bipartite table, the computed reciprocal is guaranteed to be faithful.

The exemplary bipartite construction algorithm for computing the P and N tables for the positive and negative components of a bipartite reciprocal table can now be described. The algorithm generates 3k−1+u bit faithful reciprocals of a 3k+1+u bit input operand for u=0, 1, −1.

The 3k+1+u bit input operand $1.b_{3k+u}b_{3k+U-1},\ldots b_3b_2b_1b_0$ is partitioned into three parts, $$x_h = b3k+ub3_{k-1+u} \ldots b_{2k+u}$$

$$x_m = b_{2k+u-1}b_{2k+u-2} \ldots b_k$$

$$x_1 = b_{k-1}b_{k-2} \ldots b_0$$

where $x_h$ is the k+1 bit high order part, xm is the k+u bit middle order part, and x1 is the k bit low order part.

The three parts $[x_h|x_m|x_1]$ can be represented respectively by a radix k+1 digit, a radix k+u digit, and a radix k digit. Thus, any input operand x is encoded as $[x_h|x_m x_1]$ whose value is $1+2^{-(k+1)}x_h+2^{-(k+u)}x_m+2^{-k}x_1$
An input operand $[1 |m|n]$ is the n-$1^{th}$ entry of the m-$1^{th}$ segment in the l-$1^{th}$ block of the 3k+1+u-bits-in, 3k−1+u-bits-out bipartite reciprocal table.

The high and middle order parts $[x_h|x_m]$ index to a 2k+1+u bits-in, 3k+1+u bits-out positive component P Table, and the high and low order parts $[x_h|x_1]$ index to a 2k+1-bits-in, k+1-bits-out negative component N Table.

The infinite precision middle point reciprocal of the 3k+1+u bit input x is defined to be $recip_{mid}([xh|xm|x1])$.

The exemplary construction algorithm for bipartite reciprocal table construction is as follows.

Stimulus: Integers k≧2, and u=0, 1, −1

Response: Bipartite P and N Tables

P Table —2k+1+u-bits-in, 3k+1+u-bits-out

N Table —2k+1-bits-in, k+1-bits-out

Method:

Step 1 [Construct P Table]
   for $x_h$=0 to $2^{k+1}$ −1 step 1
   for $x_m$=0 to $2^{k+u}$ −1 step 1
   <for each segment in each block>
    L1: firstspread($x_h$)=$recip_{mid}([x_h|0|0])-recip_{mid}($
     $[x_h|0|2^k-1])$
    L2: lastspread($x_h$)=$recip_{mid}([x_h|2^{k+u}-1|0])-recip_{mid}($
     $[x_h|2^{k+u}-1 |2^{k-1}])$ $$L3: \text{average spread}(x_h) = \frac{\text{firstspread}(x_h) + \text{lastspread}(x_h)}{2}$$

L4: spread($x_h,x_m$)=$recip_{mid}([x_h|x_m|0])-recip_{mid}($
     $[x_h x_m|2^k-1])$ <compute the spread of the segment>

$$L5: \text{adust}(x_h,x_m) = \frac{\text{averagespread}(x_h) - \text{spread}(x_h,x_m)}{2}$$

<compute the adjustment>
    L6: P($x_h,x_m$)=$recip_{mid}([x_h|x_m|0])$+adjust($x_h,x_m$)
    L7: Round down P($x_h,x_m$) to 3k+1+u bits
   end
Step 2 [Construction of N Table]
   for $x_h$=0 to $2^{k+1}$ −1 step 1
   for $x_1$=0 to $2^k$−1 step 1
   <for each block construct $2^k$ Table N entries>
   begin
    L8: firstdiff($x_h$, $x_1$)=$recip_{mid}([x_h|0|0])-recip_{mid}($
     $[x_h|0|x_1])$
    L9: lastdiff($x_h,x_1$)=$recip_{mid}([x_h|2^{k+u} -1|X_1])-recip_{mid}($
     $[x_h|2^{k+u} -1 |X_1])$ $$L10: N(x_h,x_l) = \frac{\text{firstdiff}(x_h,x_l) + \text{lastdiff}(x_h,x_l)}{2}$$

L11: Round to nearest N($x_h$, $x_1$) to k+1 bits
   end

The construction algorithm has been used to construct a faithful (j+2, j) bipartite reciprocal table with j+2-bits-in and j-bits-out for 10≦j≦16.

Table 4 provides a comparison of such bipartite tables with optimal conventional tables of (a) j+1-bits-in, j-bits-out, and (b) j+2-bits-in, j-bits-out.

TABLE 4

| | j + 1-bits-in,j-bits-out Optimal ROM table | | | j + 2-bits-in,j-bits-out Optimal ROM table | | | j + 2-bits-in,j-bits-out Bipartite table | | |
|---|---|---|---|---|---|---|---|---|---|
| j | Table size (Kbytes) | Percent not RN | Max error (ulps) | Table size (Kbytes) | Percent not RN | Max error (ulps) | Table size (Kbytes) | Percent not RN | Max error (ulps) |
| 10 | 2.5 | 12.453 | 0.999 | 5 | 6.259 | 0.722 | 0.6875 | 8.628 | 0.826 |
| 11 | 5.5 | 12.710 | ≈1 | 11 | 6.126 | 0.736 | 1.125 | 8.514 | 0.857 |
| 12 | 12 | 12.694 | ≈1 | 24 | 6.103 | 0.743 | 2.0625 | 8.438 | 0.853 |
| 13 | 26 | 12.511 | ≈1 | 52 | 6.217 | 0.746 | 3.375 | 8.638 | 0.865 |
| 14 | 56 | 12.501 | ≈1 | 112 | 6.248 | 0.748 | 5.5 | 8.616 | 0.901 |
| 15 | 120 | 12.455 | ≈1 | 240 | 6.228 | 0.747 | 10 | 8.578 | 0.904 |
| 16 | 256 | 12.522 | ≈1 | 512 | 6.259 | 0.748 | 16 | 8.677 | 0.919 |

Table 4 illustrates table size in Kbytes=$2^{13}$ bits, percentage of inputs not RN, and maximum absolute error in ulps.

Note that the (j+1, j) optimal table is the minimum sized table to guarantee faithful reciprocals. The (j+2, j) bipartite table size is compared to the (j+1, j) optimal table size to obtain the proper measure of faithful compression.

Table 4 shows that while the compression factor ranges from about four to sixteen, the (j+2, j) bipartite table consistently outperforms the (j+1, j) optimal conventional table in percentage of inputs round-to-nearest and maximum absolute error (in ulps) incurred. The percentage of inputs round-to-nearest in the (j+2, j) bipartite table is about 91.5% compared to about 87.6% in the (j+1, j) optimal conventional table. Thus, even though a (j+2, j) bipartite table is not guaranteed optimal, the percentage of the input arguments for which the output of the bipartite table is the round to nearest value is nearly as high as possible as given by the optimal (j+2, j) table.

Table 4 also shows that while the maximum absolute error in ulps incurred by the (j+2, j) bipartite table grows from 0.826 ulps to 0.919 ulps approaching the upper bound of 1 ulp for large j, it is still better than the worst absolute error suffered in the (j+1, j) optimal table which is very to one ulp for any j, realized at the very first entry of the Table.

For iterative refinement division methods such as Newton-Raphson or convergence division, reducing the maximum relative error in the initial approximation to the reciprocal can be more of a concern than the one ulp accuracy guaranteed. For those applications, the maximum relative error in a bipartite table can be measured using the pre-rounded borrow-save value and compared with that of the optimal table where the maximum relative error is known to be minimized.

Table 5 illustrates the precision of the j+2 bit unrounded borrow-save values of the (j+2, j) bipartite table, and the precision of optimal (j+2, j+2) and optimal (j+1, j+2) tables for j=10, 12, 14, 16:

TABLE 5

| j | 10 | 12 | 14 | 16 |
|---|---|---|---|---|
| (j + 2, j + 2) conventional | 12.428 | 14.423 | 16.418 | 18.417 |
| (j + 1, j + 2) conventional | 11.701 | 13.687 | 15.683 | 17.680 |
| j + 2 bit bipartite unrounded | 11.744 | 13.678 | 15.678 | 17.634 |

Observe that the minimum precision of the j+2 bit unrounded borrow-save values of the (j+2, j) bipartite table and that of the optimal (j+1, j+2) table are about the same, with the precision of the optimal (j+2, j+2) table larger by about 0.7 bits. So the bipartite table compares reasonably with the optimal (j+1, j+2) table in terms of precision, for which the slightly larger compression factors ranging from 4 to 18 as j goes from 10 to 16 are obtained.

2. Bipartite Reciprocal Unit

Referring to FIG. 1, the exemplary bipartite reciprocal unit 10 can be used in combination with a Booth recoded multiplier, such as to perform multiplicative division in accordance with aspects of the invention.

FIG. 3a iillustrates a Booth recoded multiplier such as could be used in combination with the exemplary bipartite reciprocal unit. The multiplier 30 includes a redundant binary recoder 31 that recodes that multiplier input to control partial product generators 32 which receive the multiplicand. The output of the partial product generators is input to a partial products adder tree 34—the redundant output of this tree can be fed back to the multiplier input, or converted to non redundant form by a converter 35.

Referring to FIGS. 1 and 3a, the bipartite reciprocal unit 10 and the multiplier 30 together comprise an arithmetic processor.

For multiplicative division operations, the arithmetic processor receives an input divisor argument of arbitrary length (such as IEEE double extended). In accordance with conventional multiplicative division operations, a selected higher order portion of the input divisor argument forms the table index 14 input to the bipartite reciprocal unit, and in particular to the bipartite reciprocal table 12.

The bipartite reciprocal table 12 —including bipartite component P and N Tables —may be constructed according to any of the three bipartite compression procedures described in Section 1.2 —(a) custom faithful and optimal (Section 1.2.1), (b) custom faithful but non-optimal (Section 1.2.2), or (c) using the bipartite construction algorithm (Section 1.2.3). The bipartite compression technique achieves significant compression factors for practically sized seed reciprocal generation, enabling either (a) a significant reduction in the size of a seed reciprocal table, or (b) a significant reduction in cycle time required for iterative reciprocal refinement (through the use of more accurate seed reciprocals and fewer iterations).

The input bipartite table index 14 is partitioned into high, middle, and low order parts $[x_h|x_m|x_1]$. The high and middle order parts $[x_h|x_m]$ index to the P Table to look up the positive component of the reciprocal, while the high and low order parts $[X_h |x_m]$ index to the N Table to look up the negative component of the reciprocal.

The exemplary bipartite reciprocal unit 10 provides a redundant borrow-save reciprocal output to fusion logic 16. For use in the arithmetic processor for multiplicative division operations, fusion logic 16 comprises the redundant binary recoder 31 of the multiplier 30 (see, Section 2.1). Alternatively, fusion logic (such as an adder with rounding) can be implemented to fuse the redundant P and N components output from bipartite reciprocal table 12 to obtain a nonredundant reciprocal (see, Section 2.2).

2.1. Redundant Input To Recoder

Referring to FIGS. 1 and 3a, for the exemplary arithmetic processor formed by the combination of the bipartite reciprocal unit 10 and multiplier 30, in accordance with aspects of the invention, the redundant reciprocal output from the bipartite table 12 is input directly to the redundant binary recoder 31. The fusion of positive and negative borrow-save reciprocal components is accomplished in the recoder, including a round-off of a couple of low order bits to obtain the one ulp (faithful) precision guarantee.

Figure 3B:
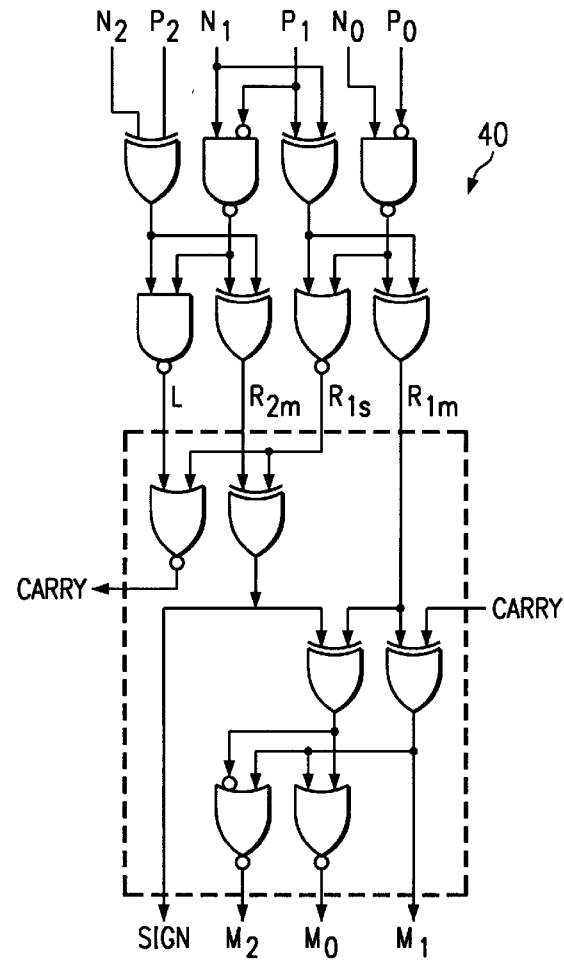
FIG. 3b illustrates an exemplary Booth recoder configured for direct input of the redundant borrow-save output from the bipartite reciprocal unit according to aspects of the invention.

FIG. 3b illustrates the design of an exemplary booth recoder that accepts the direct input of the redundant borrow-save reciprocal output of the bipartite reciprocal unit. The recoder 40 is a Radix 4 Booth recoder —the redundant binary recoder 31 in FIG. 1 comprises a plurality of identical recoders 40 corresponding to the number of partial product generators (which in turn is determined by the number of bits in the multiplicand and the Booth radix value).

Figure 4:
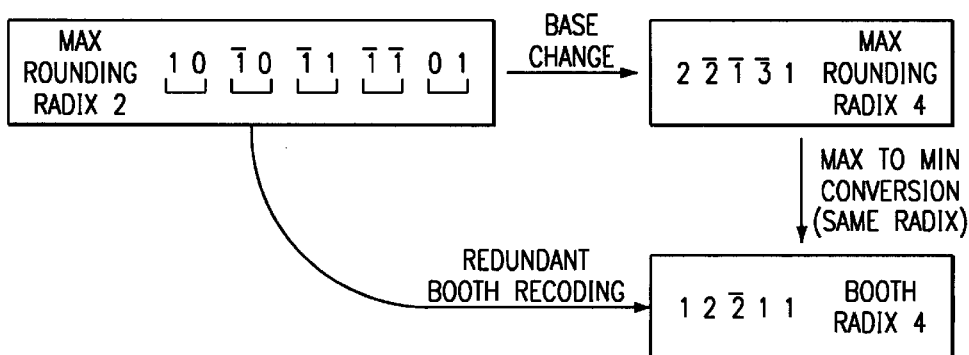
FIG. 4 illustrates the conversion embodied in the redundant Booth recoding operation as a base change to a maximally redundant Radix 4 format, and then a maximally to minimally redundant conversion to Booth Radix 4.

The radix 4 Booth recoder 40 recodes the input redundant borrow-save digit set {−1, 0, 1} to the Radix 4 digit set {−2, −1, 0, 1, 2}, in effect performing a base and digit set conversion. FIG. 4 illustrates the conversion embodied in the redundant Booth recoding operation implemented by each recoder 40 note that redundant Booth recoding can be thought of as a base change to a maximally redundant Radix 4 format, and then a maximally to minimally redundant conversion to Booth Radix 4 (eliminating the maximally redundant digit values −3 and +3).

The recoder provides a 4 bit PPG control output [Sign |M2 |M1 |M09 , corresponding to a sign bit and a three-bit (2, 1, 0) one-hot magnitude field. The operation of each partial product generator in response to the corresponding PPG control output from one of the recoders 40 is conventional.

Each recoder receives three bits of both the positive and negative borrow-save output from the bipartite reciprocal unit. Specifically, the recoder 40 receives bits [P2:P0] and [N2:N0].

The Radix 4 implementation of a Booth recoder that recodes a redundant Borrow-Save input can be readily extended to a Radix 8 Booth recoder. Moreover, these techniques can be extended to other redundant representation encodings, such as sign-magnitude and carry-save.

Thus, with little extra logic complexity, the recoder can be used to convert the redundant binary values {-1,0,1} of the borrow-save reciprocal output of the bipartite reciprocal table unit to the Booth recoded radix four digits {2,-1,0,1,2} or radix eight digits {-4,-3, -2,-1,0,1,2,3,4}. The Booth recoded reciprocal output from this process can be obtained in time only negligibly greater than for the conventional Booth recoding of the output of a conventional binary (nonredundant) reciprocal table output.

2.2. Conversion To Nonredundant

Referring to FIG. 1, as an alternative to inputting the redundant reciprocal output directly to a Booth recoder, fusion logic 16 can be implemented to perform direct conversion to a nonredundant reciprocal output. Such fusion would entail an addition and a rounding of the redundant borrow-save positive and negative components, resulting in the attendant carry completion delay.

3. Alternative Bipartite Function Units

The exemplary implementation of the bipartite compression technique has been described relative to implementing a bipartite reciprocal unit.

Alternatively, the bipartite compression technique, and the associated bipartite table design methodology, can be used to implement other functions, such as root reciprocal, logarithm, and exponential. The only requirement is that the function exhibit a relatively smooth change in slope over each block.

3. Conclusion

Although the Detailed Description of the invention has been directed to certain exemplary embodiments, various modifications of these embodiments, as well as alternative embodiments, will be suggested to those skilled in the art.

The bipartite compression technique has been described in connection with constructing an exemplary bipartite reciprocal table that provides a redundant output in borrow-save (positive-negative) format. The bipartite compression technique has general application to constructing a bipartite table function unit that receives an input table index and provides a redundant output, where the bipartite table unit comprises first and second component tables in which (a) the first table is indexed with a first component index formed by a first subset of the input table index, and outputs a first component, and (b) the second table is indexed with a second component index formed by a second subset of the input table index, and outputs a second component. Examples of other redundant representations include sign-magnitude and carry-save (carry-sum). Examples of table functions other than reciprocals include root reciprocal, logarithm, and exponential.

Moreover, various modifications based on trade-offs between hardware and software logic will be apparent to those skilled in the art.

The invention encompasses any modifications or alternative embodiments that fall within the scope of the claims.

TABLE 1

Appendix
Optimal 5 bits in,4 bits out Reciprocal Table

| Chopped Input | Input Interval | Middle point Reciprocal x(1/32) | Rounded Reciprocal | Output Interval x(1/32) | Error Interval in ulps | Percentage Not RN |
|---|---|---|---|---|---|---|
| 1.00000 | [32/32,33/32) | 31.508 | 32 | (31.030,32.000] | (−0.970,0.000] | 49.21 |
| 1.00001 | [33/32,34/32) | 30.567 | 31 | (30.118,31.030] | (−0.882,0.030] | 42.62 |
| 1.00010 | [34/32,35/32) | 29.681 | 30 | (29.257,30.118] | (−0.743,0.118] | 28.81 |
| 1.00011 | [35/32,36/32) | 28.845 | 29 | (28.444,29.257] | (−0.556,0.257] | 7.02 |
| 1.00100 | [36/32,37/32) | 28.055 | 28 | (27.676,28.444] | (−0.324,0.444] | 0.00 |
| 1.00101 | [37/32,38/32) | 27.307 | 27 | (26.947,27.676] | (−0.053,0.676] | 23.64 |
| 1.00110 | [38/32,39/32) | 26.597 | 27 | (26.256,26.947] | (−0.744,−0.053] | 35.85 |
| 1.00111 | [39/32,40/32) | 25.924 | 26 | (25.600,26.256] | (−0.400,0.256] | 0.00 |
| 1.01000 | [40/32,41/32) | 25.284 | 25 | (24.976,25.600] | (−0.024,0.600] | 15.69 |
| 1.01001 | [41/32,42/32) | 24.675 | 25 | (24.381,24.976] | (−0.619,−0.024] | 20.41 |
| 1.01010 | [42/32,43/32) | 24.094 | 24 | (23.814,24.381] | (−0.186,0.381] | 0.00 |
| 1.01011 | [43/32,44/32) | 23.540 | 24 | (23.273,23.814] | (−0.727,−0.186] | 42.55 |
| 1.01100 | [44/32,45/32) | 23.011 | 23 | (22.756,23.273] | (−0.244,0.273] | 0.00 |
| 1.01101 | [45/32,46/32) | 22.505 | 23 | (22.261,22.756] | (−0.739,−0.244] | 48.89 |
| 1.01110 | [46/32,47/32) | 22.022 | 22 | (21.787,22.261] | (−0.213,0.261] | 0.00 |
| 1.01111 | [47/32,48/32) | 21.558 | 22 | (21.333,21.787] | (−0.667,−0.213] | 37.21 |
| 1.10000 | [48/32,49/32) | 21.113 | 21 | (20.898,21.333] | (−0.102,0.333] | 0.00 |
| 1.10001 | [49/32,50/32) | 20.687 | 21 | (20.480,20.898] | (−0.520,−0.102] | 4.88 |
| 1.10010 | [50/32,51/32) | 20.277 | 20 | (20.078,20.480] | (0.078,0.480] | 0.00 |
| 1.10011 | [51/32,52/32) | 19.883 | 20 | (19.692,20.078] | (−0.308,0.078] | 0.00 |
| 1.10100 | [52/32,53/32) | 19.505 | 20 | (19.321,19.692] | (−0.679,−0.308] | 48.72 |
| 1.10101 | [53/32,54/32) | 19.140 | 19 | (18.963,19.321] | (−0.037,0.321] | 0.00 |
| 1.10110 | [54/32,55/32) | 8.789 | 19 | (18.618,18.963] | (−0.382,−0.037] | 0.00 |
| 1.10111 | [55/32,56/32) | 18.450 | 18 | (18.286,18.618] | (0.286,0.618] | 35.14 |
| 1.11000 | [56/32,57/32) | 18.124 | 18 | (17.965,18.286] | (−0.035,0.286] | 0.00 |
| 1.11001 | [57/32,58/32) | 17.809 | 18 | (17.655,17.965] | (−0.345,−0.035] | 0.00 |
| 1.11010 | [58/32,59/32) | 17.504 | 18 | (17.356,17.655] | (−0.644,−0.345] | 48.57 |
| 1.11011 | [59/32,60/32) | 17.210 | 17 | (17.067,17.356] | (0.067,0.356] | 0.00 |
| 1.11100 | [60/32,61/32) | 16.926 | 17 | (16.787,17.067] | (−0.213,0.067] | 0.00 |
| 1.11101 | [61/32,62/32) | 16.650 | 17 | (16.516,16.787] | (−0.484,−0.213] | 0.00 |
| 1.11110 | [62/32,63/32) | 16.384 | 16 | (16.254,16.516] | (0.254,0.516] | 6.06 |

TABLE 1-continued

Appendix
Optimal 5 bits in,4 bits out Reciprocal Table

| Chopped Input | Input Interval | Middle point Reciprocal x(1/32) | Rounded Reciprocal | Output Interval x(1/32) | Error Interval in ulps | Percentage Not RN |
|---|---|---|---|---|---|---|
| 1.11111 | [63/32,64/32) | 16.126 | 16 | (16.000,16.254] | (0.000,0.254] | 0.00 |

TABLE 2A

Appendix
(4,7) positive part and (4,4) negative part
ROM tables composing the borrow-save result of a
6-bits-in,5-bits-out optimal bipartite reciprocal table

| Input Index Bits | Positive Part | Input Index Bits | Negative Part |
|---|---|---|---|
| 1.00 00 xx | 0.1 1111110 1 | 1.00 xx 00 | 0.0000 0000 0 |
| 1.00 01 xx | 0.1 1101111 1 | 1.00 xx 01 | 0.0000 0011 0 |
| 1.00 10 xx | 0.1 1100001 1 | 1.00 xx 10 | 0.0000 0111 0 |
| 1.00 11 xx | 0.1 1011000 1 | 1.00 xx 11 | 0.0000 1010 0 |
| 1.01 00 xx | 0.1 1001010 1 | 1.01 xx 00 | 0.0000 0000 0 |
| 1.01 01 xx | 0.1 1000000 1 | 1.01 xx 01 | 0.0000 0010 0 |
| 1.01 10 xx | 0.1 0111000 1 | 1.01 xx 10 | 0.0000 0101 0 |
| 1.01 11 xx | 0.1 0110000 1 | 1.01 xx 11 | 0.0000 0111 0 |
| 1.10 00 xx | 0.1 0101001 1 | 1.10 xx 00 | 0.0000 0000 0 |
| 1.10 01 xx | 0.1 0100011 1 | 1.10 xx 01 | 0.0000 0010 0 |
| 1.10 10 xx | 0.1 0011100 1 | 1.10 xx 10 | 0.0000 0011 0 |
| 1.10 11 xx | 0.1 0010111 1 | 1.10 xx 11 | 0.0000 0101 0 |
| 1.11 00 xx | 0.1 0010001 1 | 1.11 xx 00 | 0.0000 0000 0 |
| 1.11 01 xx | 0.1 0001101 1 | 1.11 xx 01 | 0.0000 0010 0 |
| 1.11 10 xx | 0.1 0001000 1 | 1.11 xx 10 | 0.0000 0011 0 |
| 1.11 11 xx | 0.1 0000100 1 | 1.11 xx 11 | 0.0000 0100 0 |

TABLE 2B

Appendix
Optimal 5 bit reciprocals generated from the (6,5) bipartite reciprocal table

| Chopped Input x(1/64) | Low end Reciprocal x(1/64) | Middle point Reciprocal x(1/64) | Rounded Reciprocal x(1/64) | Table P Value + ⅛ x(1/64) | Table N Value x(1/64) | Computed Reciprocal x(1/64) | Rounded Comp. Recip. x(1/64) |
|---|---|---|---|---|---|---|---|
| 64 | 64.000 | 63.504 | 64 | 63.625 | 0.00 | 63.625 | 64 |
| 65 | 63.015 | 62.334 | 63 | | 0.75 | 62.875 | 63 |
| 66 | 62.061 | 61.594 | 62 | | 1.75 | 61.875 | 62 |
| 67 | 61.134 | 60.681 | 61 | | 2.50 | 61.125 | 61 |
| 68 | 60.235 | 59.796 | 60 | 59.875 | 0.00 | 59.875 | 60 |
| 69 | 59.362 | 58.935 | 59 | | 0.75 | 59.125 | 59 |
| 70 | 58.514 | 58.099 | 58 | | 1.75 | 58.125 | 58 |
| 71 | 57.690 | 57.287 | 57 | | 2.50 | 57.375 | 57 |
| 72 | 56.889 | 56.497 | 56 | 56.375 | 0.00 | 56.375 | 56 |
| 73 | 56.110 | 55.728 | 56 | | 0.75 | 55.625 | 56 |
| 74 | 55.351 | 54.980 | 55 | | 1.75 | 54.625 | 55 |
| 75 | 54.613 | 54.252 | 54 | | 2.50 | 53.875 | 54 |
| 76 | 53.895 | 53.542 | 54 | 54.125 | 0.00 | 54.125 | 54 |
| 77 | 53.195 | 52.852 | 53 | | 0.75 | 53.375 | 53 |
| 78 | 52.513 | 52.178 | 52 | | 1.75 | 52.375 | 52 |
| 79 | 51.848 | 51.522 | 52 | | 2.50 | 51.625 | 52 |
| 80 | 51.200 | 50.882 | 51 | 50.625 | 0.00 | 50.625 | 51 |
| 81 | 50.568 | 50.258 | 50 | | 0.50 | 50.125 | 50 |
| 82 | 49.951 | 49.648 | 50 | | 1.25 | 49.625 | 50 |
| 83 | 49.349 | 49.054 | 49 | | 1.75 | 49.125 | 49 |
| 84 | 48.762 | 48.473 | 48 | 48.125 | 0.00 | 48.125 | 48 |
| 85 | 48.188 | 47.906 | 48 | | 0.50 | 47.625 | 48 |
| 86 | 47.628 | 47.353 | 47 | | 1.25 | 47.125 | 47 |
| 87 | 47.080 | 46.811 | 47 | | 1.75 | 46.625 | 47 |
| 88 | 46.545 | 46.232 | 46 | 46.125 | 0.00 | 46.125 | 46 |
| 89 | 46.022 | 45.765 | 46 | | 0.50 | 45.625 | 46 |
| 90 | 45.511 | 45.260 | 45 | | 1.25 | 45.125 | 45 |

TABLE 2B-continued

Appendix
Optimal 5 bit reciprocals generated from the (6,5) bipartite reciprocal table

| Chopped Input x(1/64) | Low end Reciprocal x(1/64) | Middle point Reciprocal x(1/64) | Rounded Reciprocal x(1/64) | Table P Value + ⅛ x(1/64) | Table N Value x(1/64) | Computed Reciprocal x(1/64) | Rounded Comp. Recip. x(1/64) |
|---|---|---|---|---|---|---|---|
| 91  | 45.011 | 44.763 | 45 |        | 1.75 | 44.625 | 45 |
| 92  | 44.322 | 44.281 | 44 | 44.125 | 0.00 | 44.125 | 44 |
| 93  | 44.043 | 43.807 | 44 |        | 0.50 | 43.625 | 44 |
| 94  | 43.574 | 43.344 | 43 |        | 1.25 | 43.125 | 43 |
| 95  | 43.116 | 42.890 | 43 |        | 1.75 | 42.625 | 43 |
| 96  | 42.567 | 42.446 | 42 | 42.375 | 0.00 | 42.375 | 42 |
| 97  | 42.227 | 42.010 | 42 |        | 0.50 | 41.375 | 42 |
| 98  | 41.796 | 41.584 | 42 |        | 0.75 | 41.625 | 42 |
| 99  | 41.374 | 41.166 | 41 |        | 1.25 | 41.125 | 41 |
| 100 | 40.960 | 40.756 | 41 | 40.875 | 0.00 | 40.875 | 41 |
| 101 | 40.554 | 40.355 | 40 |        | 0.50 | 40.375 | 40 |
| 102 | 40.157 | 39.961 | 40 |        | 0.75 | 39.125 | 40 |
| 103 | 39.767 | 39.573 | 40 |        | 1.25 | 39.625 | 40 |
| 104 | 39.385 | 39.196 | 39 | 39.125 | 0.00 | 39.125 | 39 |
| 105 | 39.010 | 38.825 | 39 |        | 0.50 | 38.625 | 39 |
| 106 | 38.642 | 38.460 | 38 |        | 0.75 | 38.375 | 38 |
| 107 | 38.280 | 38.102 | 38 |        | 1.25 | 37.875 | 38 |
| 108 | 37.926 | 37.751 | 38 | 37.875 | 0.00 | 37.875 | 38 |
| 109 | 37.578 | 37.406 | 37 |        | 0.50 | 37.375 | 37 |
| 110 | 37.236 | 37.068 | 37 |        | 0.75 | 37.125 | 37 |
| 111 | 36.901 | 36.735 | 37 |        | 1.25 | 36.625 | 37 |
| 112 | 36.571 | 36.409 | 36 | 36.375 | 0.00 | 36.375 | 36 |
| 113 | 36.248 | 36.088 | 36 |        | 0.50 | 35.875 | 36 |
| 114 | 35.930 | 35.773 | 36 |        | 0.75 | 35.625 | 36 |
| 115 | 35.617 | 35.463 | 35 |        | 1.00 | 35.375 | 35 |
| 116 | 35.310 | 35.159 | 35 | 35.375 | 0.00 | 35.375 | 35 |
| 117 | 35.009 | 34.860 | 35 |        | 0.50 | 34.875 | 35 |
| 118 | 34.712 | 34.565 | 35 |        | 0.75 | 34.625 | 35 |
| 119 | 34.420 | 34.276 | 34 |        | 1.00 | 34.375 | 34 |
| 120 | 34.133 | 33.992 | 34 | 34.125 | 0.00 | 34.125 | 34 |
| 121 | 33.851 | 33.712 | 34 |        | 0.50 | 33.625 | 34 |
| 122 | 33.574 | 33.437 | 33 |        | 0.75 | 33.375 | 33 |
| 123 | 33.301 | 33.166 | 33 |        | 1.00 | 33.125 | 33 |
| 124 | 33.032 | 32.900 | 33 | 33.125 | 0.00 | 33.125 | 33 |
| 125 | 32.768 | 32.637 | 33 |        | 0.50 | 32.625 | 33 |
| 126 | 32.508 | 32.379 | 32 |        | 0.75 | 32.375 | 32 |
| 127 | 32.252 | 32.125 | 32 |        | 1.00 | 32.125 | 32 |

TABLE 3A

Appendix
(5,8) positive part ROM table of a 7-bits-in,6-bits-out optimal bipartite reciprocal table

| Input Index Bits | Positive Part | Input Index Bits | Positive Part |
|---|---|---|---|
| 1.000 00 xx | 0.1 11111110 1 | 1.100 00 xx | 0.1 01010100 1 |
| 1.000 01 xx | 0.1 11101111 1 | 1.100 01 xx | 0.1 01001101 1 |
| 1.000 10 xx | 0.1 11100001 1 | 1.100 10 xx | 0.1 01000111 1 |
| 1.000 11 xx | 0.1 11010011 1 | 1.100 11 xx | 0.1 01000000 1 |
| 1.001 00 xx | 0.1 11000101 1 | 1.101 00 xx | 0.1 00111010 1 |
| 1.001 01 xx | 0.1 10111001 1 | 1.101 01 xx | 0.1 00110100 1 |
| 1.001 10 xx | 0.1 10101101 1 | 1.101 10 xx | 0.1 00101111 1 |
| 1.001 11 xx | 0.1 10100011 1 | 1.101 11 xx | 0.1 00101001 1 |
| 1.010 00 xx | 0.1 10011000 1 | 1.110 00 xx | 0.1 00100011 1 |
| 1.010 01 xx | 0.1 10001110 1 | 1.110 01 xx | 0.1 00011110 1 |
| 1.010 10 xx | 0.1 10000101 1 | 1.110 10 xx | 0.1 00011001 1 |
| 1.010 11 xx | 0.1 01111011 1 | 1.110 11 xx | 0.1 00010100 1 |
| 1.011 00 xx | 0.1 01110010 1 | 1.111 00 xx | 0.1 00010000 1 |
| 1.011 01 xx | 0.1 01101010 1 | 1.111 01 xx | 0.1 00001011 1 |
| 1.011 10 xx | 0.1 01100010 1 | 1.111 10 xx | 0.1 00000111 1 |
| 1.011 11 xx | 0.1 01011011 1 | 1.111 11 xx | 0.1 00000011 1 |

TABLE 3B (5,4) negative part ROM table of a 7-bits-in,6-bits-out optimal bipartite reciprocal table

| Input Index Bits | Negative Part | Input Index Bits | Negative Part |
|---|---|---|---|
| 1.000 xx 00 | 0.00000 0000 0 | 1.100 xx 00 | 0.00000 0000 0 |
| 1.000 xx 01 | 0.00000 0100 0 | 1.100 xx 01 | 0.00000 0010 0 |
| 1.000 xx 10 | 0.00000 1000 0 | 1.100 xx 10 | 0.00000 0011 0 |
| 1.000 xx 11 | 0.00000 1100 0 | 1.100 xx 11 | 0.00000 0100 0 |
| 1.001 xx 00 | 0.00000 0000 0 | 1.101 xx 00 | 0.00000 0000 0 |
| 1.001 xx 01 | 0.00000 0010 0 | 1.101 xx 01 | 0.00000 0010 0 |
| 1.001 xx 10 | 0.00000 0110 0 | 1.101 xx 10 | 0.00000 0011 0 |
| 1.001 xx 11 | 0.00000 1001 0 | 1.101 xx 11 | 0.00000 0101 0 |
| 1.010 xx 00 | 0.00000 0000 0 | 1.110 xx 00 | 0.00000 0000 0 |
| 1.010 xx 01 | 0.00000 0011 0 | 1.110 xx 01 | 0.00000 0001 0 |
| 1.010 xx 10 | 0.00000 0101 0 | 1.110 xx 10 | 0.00000 0010 0 |
| 1.010 xx 11 | 0.00000 0111 0 | 1.110 xx 11 | 0.00000 0011 0 |
| 1.011 xx 00 | 0.00000 0000 0 | 1.111 xx 00 | 0.00000 0000 0 |
| 1.011 xx 01 | 0.00000 0010 0 | 1.111 xx 01 | 0.00000 0001 0 |
| 1.011 xx 10 | 0.00000 0011 0 | 1.111 xx 10 | 0.00000 0010 0 |
| 1.011 xx 11 | 0.00000 0101 0 | 1.111 xx 11 | 0.00000 0011 0 |

TABLE 4A

Appendix
(6,9) positive part ROM table of an 8-bits-in,7-bits-out
optimal bipartite reciprocal table

| Input Index Bits | Positive Part | Input Index Bits | Positive Part |
| --- | --- | --- | --- |
| 1.000 000 xx | 0.1 111111110 1 | 1.100 000 xx | 0.1 010101001 1 |
| 1.000 001 xx | 0.1 111101110 1 | 1.100 001 xx | 0.1 010100010 1 |
| 1.000 010 xx | 0.1 111011110 1 | 1.100 010 xx | 0.1 010011100 1 |
| 1.000 011 xx | 0.1 111001110 1 | 1.100 011 xx | 0.1 010010100 1 |
| 1.000 100 xx | 0.1 111000001 1 | 1.100 100 xx | 0.1 010001110 1 |
| 1.000 101 xx | 0.1 110110010 1 | 1.100 101 xx | 0.1 010001000 1 |
| 1.000 110 xx | 0.1 110100110 1 | 1.100 110 xx | 0.1 010000001 1 |
| 1.000 111 xx | 0.1 110011001 1 | 1.100 111 xx | 0.1 001111011 1 |
| 1.001 000 xx | 0.1 110001100 1 | 1.101 000 xx | 0.1 001110101 1 |
| 1.001 001 xx | 0.1 110000000 1 | 1.101 001 xx | 0.1 001101111 1 |
| 1.001 010 xx | 0.1 101110100 1 | 1.101 010 xx | 0.1 001101001 1 |
| 1.001 011 xx | 0.1 101101000 1 | 1.101 011 xx | 0.1 001100100 1 |
| 1.001 100 xx | 0.1 101011101 1 | 1.101 100 xx | 0.1 001011110 1 |
| 1.001 101 xx | 0.1 101010001 1 | 1.101 101 xx | 0.1 001011000 1 |
| 1.001 110 xx | 0.1 101000111 1 | 1.101 110 xx | 0.1 001010011 1 |
| 1.001 111 xx | 0.1 100111100 1 | 1.101 111 xx | 0.1 001001101 1 |
| 1.010 000 xx | 0.1 100110001 1 | 1.110 000 xx | 0.1 001001000 1 |
| 1.010 001 xx | 0.1 100100111 1 | 1.110 001 xx | 0.1 001000100 1 |
| 1.010 010 xx | 0.1 100011110 1 | 1.110 010 xx | 0.1 000111111 1 |
| 1.010 011 xx | 0.1 100010100 1 | 1.110 011 xx | 0.1 000111001 1 |
| 1.010 100 xx | 0.1 100001011 1 | 1.110 100 xx | 0.1 000110100 1 |
| 1.010 101 xx | 0.1 100000001 1 | 1.110 101 xx | 0.1 000110000 1 |
| 1.010 110 xx | 0.1 011111001 1 | 1.110 110 xx | 0.1 000101011 1 |
| 1.010 111 xx | 0.1 011110000 1 | 1.110 111 xx | 0.1 000100111 1 |
| 1.011 000 xx | 0.1 011100111 1 | 1.111 000 xx | 0.1 000100001 1 |
| 1.011 001 xx | 0.1 011011111 1 | 1.111 001 xx | 0.1 000011100 1 |
| 1.011 010 xx | 0.1 011010111 1 | 1.111 010 xx | 0.1 000011000 1 |
| 1.011 011 xx | 0.1 011001111 1 | 1.111 011 xx | 0.1 000010100 1 |
| 1.011 100 xx | 0.1 011000111 1 | 1.111 100 xx | 0.1 000001111 1 |
| 1.011 101 xx | 0.1 011000000 1 | 1.111 101 xx | 0.1 000001011 1 |
| 1.011 110 xx | 0.1 010111001 1 | 1.111 110 xx | 0.1 000000111 1 |
| 1.011 111 xx | 0.1 010110001 1 | 1.111 111 xx | 0.1 000000011 1 |

TABLE 4B (5,4) negative part ROM table of an 8-bits-in,7-bits-out
optimal bipartite reciprocal table

| Input Index Bits | Negative Part | Input Index Bits | Negative Part |
| --- | --- | --- | --- |
| 1.000 xxx 00 | 0.000000 0000 0 | 1.100 xxx 00 | 0.000000 0000 0 |
| 1.000 xxx 01 | 0.000000 0011 0 | 1.100 xxx 01 | 0.000000 0010 0 |
| 1.000 xxx 10 | 0.000000 0111 0 | 1.100 xxx 10 | 0.000000 0011 0 |
| 1.000 xxx 11 | 0.000000 1010 0 | 1.100 xxx 11 | 0.000000 0101 0 |
| 1.001 xxx 00 | 0.000000 0000 0 | 1.101 xxx 00 | 0.000000 0000 0 |
| 1.001 xxx 01 | 0.000000 0011 0 | 1.101 xxx 01 | 0.000000 0010 0 |
| 1.001 xxx 10 | 0.000000 0110 0 | 1.101 xxx 10 | 0.000000 0011 0 |
| 1.001 xxx 11 | 0.000000 1001 0 | 1.101 xxx 11 | 0.000000 0101 0 |
| 1.010 xxx 00 | 0.000000 0000 0 | 1.110 xxx 00 | 0.000000 0000 0 |
| 1.010 xxx 01 | 0.000000 0010 0 | 1.110 xxx 01 | 0.000000 0010 0 |
| 1.010 xxx 10 | 0.000000 0101 0 | 1.110 xxx 10 | 0.000000 0011 0 |
| 1.010 xxx 11 | 0.000000 0111 0 | 1.110 xxx 11 | 0.000000 0101 0 |
| 1.011 xxx 00 | 0.000000 0000 0 | 1.111 xxx 00 | 0.000000 0000 0 |
| 1.011 xxx 01 | 0.000000 0011 0 | 1.111 xxx 01 | 0.000000 0001 0 |
| 1.011 xxx 10 | 0.000000 0101 0 | 1.111 xxx 10 | 0.000000 0010 0 |
| 1.011 xxx 11 | 0.000000 0110 0 | 1.111 xxx 11 | 0.000000 0011 0 |

TABLE 5A

Appendix
(6,10) positive part ROM table of a 9-bits-in,8-bits-out
faithful bipartite reciprocal table

| Input Index Bits | Positive Part | Input Index Bits | Positive Part |
| --- | --- | --- | --- |
| 1.000 000 xxx | 0.1 1111111110 1 | 1.100 000 xxx | 0.1 0101010100 1 |
| 1.000 001 xxx | 0.1 1111011110 1 | 1.100 001 xxx | 0.1 0101000110 1 |
| 1.000 010 xxx | 0.1 1110111111 1 | 1.100 010 xxx | 0.1 0100111000 1 |
| 1.000 011 xxx | 0.1 1110100010 1 | 1.100 011 xxx | 0.1 0100101100 1 |
| 1.000 100 xxx | 0.1 1110000101 1 | 1.100 100 xxx | 0.1 0100011110 1 |
| 1.000 101 xxx | 0.1 1101101010 1 | 1.100 101 xxx | 0.1 0100010010 1 |
| 1.000 110 xxx | 0.1 1101010000 1 | 1.100 110 xxx | 0.1 0100000100 1 |
| 1.000 111 xxx | 0.1 1100110101 1 | 1.100 111 xxx | 0.1 0011111000 1 |
| 1.001 000 xxx | 0.1 1100011010 1 | 1.101 000 xxx | 0.1 0011101100 1 |
| 1.001 001 xxx | 0.1 1101000010 1 | 1.101 001 xxx | 0.1 0011100000 1 |
| 1.001 010 xxx | 0.1 1011101010 1 | 1.101 010 xxx | 0.1 0011010100 1 |
| 1.001 011 xxx | 0.1 1011010101 1 | 1.101 011 xxx | 0.1 0011001000 1 |
| 1.001 100 xxx | 0.1 1010111100 1 | 1.101 100 xxx | 0.1 0010111100 1 |
| 1.001 101 xxx | 0.1 1010100101 1 | 1.101 101 xxx | 0.1 0010110101 1 |
| 1.001 110 xxx | 0.1 1010010000 1 | 1.101 110 xxx | 0.1 0010100111 1 |
| 1.001 111 xxx | 0.1 1001111101 1 | 1.101 111 xxx | 0.1 0010011011 1 |
| 1.010 000 xxx | 0.1 1001100101 1 | 1.110 000 xxx | 0.1 0010010001 1 |
| 1.010 001 xxx | 0.1 1001010001 1 | 1.110 001 xxx | 0.1 0010001001 1 |
| 1.010 010 xxx | 0.1 1000111101 1 | 1.110 010 xxx | 0.1 0001111101 1 |
| 1.010 011 xxx | 0.1 1000101011 1 | 1.110 011 xxx | 0.1 0001110101 1 |
| 1.010 100 xxx | 0.1 1000010111 1 | 1.110 100 xxx | 0.1 0001101011 1 |
| 1.010 101 xxx | 0.1 1000000101 1 | 1.110 101 xxx | 0.1 0001100001 1 |
| 1.010 110 xxx | 0.1 0111110011 1 | 1.110 110 xxx | 0.1 0001011000 1 |
| 1.010 111 xxx | 0.1 0111100011 1 | 1.110 111 xxx | 0.1 0001001101 1 |
| 1.011 000 xxx | 0.1 0111010000 1 | 1.111 000 xxx | 0.1 0001000101 1 |
| 1.011 001 xxx | 0.1 0111000000 1 | 1.111 001 xxx | 0.1 0000111100 1 |
| 1.011 010 xxx | 0.1 0110110000 1 | 1.111 010 xxx | 0.1 0000110001 1 |
| 1.011 011 xxx | 0.1 0110100000 1 | 1.111 011 xxx | 0.1 0000101001 1 |
| 1.011 100 xxx | 0.1 0110010000 1 | 1.111 100 xxx | 0.1 0000100001 1 |
| 1.011 101 xxx | 0.1 0110000000 1 | 1.111 101 xxx | 0.1 0000011001 1 |
| 1.011 110 xxx | 0.1 0101110000 1 | 1.111 110 xxx | 0.1 0000010001 1 |
| 1.011 111 xxx | 0.1 0101100100 1 | 1.111 111 xxx | 0.1 0000001001 1 |

TABLE 5B (6,5) negative part ROM table of a 9-bits-in,8-bits-out
faithful bipartite reciprocal table

| Input Index Bits | Negative Part | Input Index Bits | Negative Part |
| --- | --- | --- | --- |
| 1.000 xxx 000 | 0.000000 00000 0 | 1.100 xxx 000 | 0.000000 00000 0 |
| 1.000 xxx 001 | 0.000000 00100 0 | 1.100 xxx 001 | 0.000000 00010 0 |
| 1.000 xxx 010 | 0.000000 00111 0 | 1.100 xxx 010 | 0.000000 00100 0 |
| 1.000 xxx 011 | 0.000000 01011 0 | 1.100 xxx 011 | 0.000000 00110 0 |
| 1.000 xxx 100 | 0.000000 01111 0 | 1.100 xxx 100 | 0.000000 01000 0 |
| 1.000 xxx 101 | 0.000000 10010 0 | 1.100 xxx 101 | 0.000000 01010 0 |
| 1.000 xxx 110 | 0.000000 10110 0 | 1.100 xxx 110 | 0.000000 01100 0 |
| 1.000 xxx 111 | 0.000000 11001 0 | 1.100 xxx 111 | 0.000000 01110 0 |
| 1.001 xxx 000 | 0.000000 00000 0 | 1.101 xxx 000 | 0.000000 00000 0 |
| 1.001 xxx 001 | 0.000000 00011 0 | 1.101 xxx 001 | 0.000000 00001 0 |
| 1.001 xxx 010 | 0.000000 00110 0 | 1.101 xxx 010 | 0.000000 00011 0 |
| 1.001 xxx 011 | 0.000000 01001 0 | 1.101 xxx 011 | 0.000000 00100 0 |
| 1.001 xxx 100 | 0.000000 01100 0 | 1.101 xxx 100 | 0.000000 00110 0 |
| 1.001 xxx 101 | 0.000000 01111 0 | 1.101 xxx 101 | 0.000000 00111 0 |
| 1.001 xxx 110 | 0.000000 10010 0 | 1.101 xxx 110 | 0.000000 01001 0 |
| 1.001 xxx 111 | 0.000000 10101 0 | 1.101 xxx 111 | 0.000000 01011 0 |
| 1.010 xxx 000 | 0.000000 00000 0 | 1.110 xxx 000 | 0.000000 00000 0 |
| 1.010 xxx 001 | 0.000000 00011 0 | 1.110 xxx 001 | 0.000000 00001 0 |
| 1.010 xxx 010 | 0.000000 00110 0 | 1.110 xxx 010 | 0.000000 00011 0 |
| 1.010 xxx 011 | 0.000000 01001 0 | 1.110 xxx 011 | 0.000000 00100 0 |
| 1.010 xxx 100 | 0.000000 01011 0 | 1.110 xxx 100 | 0.000000 00110 0 |
| 1.010 xxx 101 | 0.000000 01101 0 | 1.110 xxx 101 | 0.000000 00111 0 |
| 1.010 xxx 110 | 0.000000 01111 0 | 1.110 xxx 110 | 0.000000 01001 0 |
| 1.010 xxx 111 | 0.000000 10001 0 | 1.110 xxx 111 | 0.000000 01010 0 |
| 1.011 xxx 000 | 0.000000 00000 0 | 1.111 xxx 000 | 0.000000 00000 0 |
| 1.011 xxx 001 | 0.000000 00010 0 | 1.111 xxx 001 | 0.000000 00010 0 |
| 1.011 xxx 010 | 0.000000 00100 0 | 1.111 xxx 010 | 0.000000 00011 0 |
| 1.011 xxx 011 | 0.000000 00110 0 | 1.111 xxx 011 | 0.000000 00100 0 |

TABLE 5B-continued (6,5) negative part ROM table of a 9-bits-in,8-bits-out faithful bipartite reciprocal table

| Input Index Bits | Negative Part | Input Index Bits | Negative Part |
|---|---|---|---|
| 1.011 xxx 100 | 0.000000 01000 0 | 1.111 xxx 100 | 0.000000 00110 0 |
| 1.011 xxx 101 | 0.000000 01010 0 | 1.111 xxx 101 | 0.000000 00111 0 |
| 1.011 xxx 110 | 0.000000 01100 0 | 1.111 xxx 110 | 0.000000 01001 0 |
| 1.011 xxx 111 | 0.000000 01110 0 | 1.111 xxx 111 | 0.000000 01010 0 |

TABLE 5C

Appendix
Two lines from the 256 line enumeration of reciprocals generated by the (9,8) faithful bipartite reciprocal table

| Chopped Input x(1/512) | Low end Reciprocal x(1/512) | Middle point Reciprocal x(1/512) | Rounded Reciprocal x(1/512) | Table P Value + ⅛ x(1/512) | Table N Value x(1/512) | Prerounded Reciprocal x(1/512) | Rounded Reciprocal x(1/512) |
|---|---|---|---|---|---|---|---|
| 545 | 480.998 | 480.557 | 481 | 481.375 | 1.00 | 480.375 | 480 |
| 546 | 480.117 | 479.678 | 480 | 481.375 | 1.75 | 479.625 | 480 |

TABLE 6

Appendix
The pre-rounded reciprocals and the errors incurred in the first block of the 10-bits-in 8-bits-out bipartite reciprocal table

| Chopped Input x(1/1024) | Low end Reciprocal x(1/512) | Middle point Reciprocal x(1/512) | Table P Value x(1/512) | Table N Value x(1/512) | Pre-rounded Reciprocal x(1/512) | Difference in ulps |
|---|---|---|---|---|---|---|
| 1024 | 512.000 | 511.750 | 511.663 | 0.000 | 511.663 | 0.037 |
| 1025 | 511.500 | 511.251 | | 0.474 | 511.189 | 0.062 |
| 1026 | 511.002 | 510.753 | | 0.947 | 510.716 | 0.037 |
| 1027 | 510.504 | 510.256 | | 1.419 | 510.244 | 0.012 |
| 1028 | 510.008 | 509.760 | | 1.590 | 509.773 | −0.013 |
| 1029 | 509.512 | 509.265 | | 2.360 | 509.302 | −0.038 |
| 1030 | 509.017 | 508.770 | | 2.530 | 508.833 | −0.063 |
| 1031 | 508.524 | 508.277 | | 3.298 | 508.365 | −0.087 |
| 1032 | 508.031 | 507.785 | 507.724 | 0.000 | 507.724 | 0.061 |
| 1033 | 507.339 | 507.294 | | 0.474 | 507.250 | 0.043 |
| 1034 | 507.048 | 506.803 | | 0.947 | 506.773 | 0.026 |
| 1035 | 506.338 | 506.314 | | 1.419 | 506.305 | 0.008 |
| 1036 | 506.069 | 505.825 | | 1.890 | 505.834 | −0.009 |
| 1037 | 505.381 | 505.338 | | 2.360 | 505.364 | −0.026 |
| 1038 | 505.094 | 504.351 | | 2.330 | 504.895 | −0.043 |
| 1039 | 504.608 | 504.366 | | 3.298 | 504.426 | −0.061 |
| 1040 | 504.123 | 503.881 | 503.846 | 0.000 | 503.846 | 0.035 |
| — | — | — | — | — | — | — |
| 1047 | 500.753 | 500.514 | | 3.298 | 500.548 | −0.035 |
| 1048 | 500.273 | 500.036 | 500.027 | 0.000 | 500.027 | 0.009 |
| — | — | — | — | — | — | — |
| 1055 | 496.955 | 496.720 | | 3.295 | 496.729 | −0.009 |
| 1056 | 496.485 | 496.250 | 496.266 | 0.000 | 496.266 | −0.016 |
| — | — | — | — | — | — | — |
| 1063 | 493.215 | 492.984 | | 3.298 | 492.968 | 0.016 |
| 1064 | 492.732 | 492.520 | 492.561 | 0.000 | 492.561 | −0.040 |
| — | — | — | — | — | — | — |
| 1071 | 489.531 | 489.303 | | 3.298 | 489.263 | 0.040 |
| 1072 | 489.073 | 488.847 | 488.911 | 0.000 | 488.911 | −0.064 |
| 1073 | 488.619 | 488.391 | | 0.474 | 488.437 | −0.04 |
| 1074 | 488.164 | 487.937 | | 0.947 | 487.064 | −0.027 |
| 1075 | 487.710 | 487.483 | | 1.419 | 487.492 | −0.009 |
| 1076 | 487.257 | 487.030 | | 1.890 | 487.021 | 0.009 |
| 1077 | 486.804 | 486.578 | | 2.360 | 486.550 | 0.028 |
| 1078 | 486.353 | 486.127 | | 2.330 | 486.081 | 0.046 |

TABLE 6-continued

Appendix
The pre-rounded reciprocals and the errors incurred in the first block
of the 10-bits-in 8-bits-out bipartite reciprocal table

| Chopped Input x(1/1024) | Low end Reciprocal x(1/512) | Middle point Reciprocal x(1/512) | Table P Value x(1/512) | Table N Value x(1/512) | Pre-rounded Reciprocal x(1/512) | Difference in ulps |
|---|---|---|---|---|---|---|
| 1079 | 485.902 | 485.677 |         | 3.208 | 485.813 | 0.064 |
| 1080 | 485.452 | 485.227 | 485.315 | 0.000 | 485.315 | -0.087 |
| 1081 | 485.003 | 484.779 |         | 0.474 | 484.841 | -0.062 |
| 1082 | 484.555 | 484.331 |         | 0.947 | 484.368 | -0.037 |
| 1083 | 484.107 | 483.384 |         | 1.419 | 483.896 | -0.012 |
| 1084 | 483.681 | 483.433 |         | 1.390 | 483.425 | 0.013 |
| 1085 | 483.215 | 482.992 |         | 2.360 | 482.954 | 0.038 |
| 1086 | 482.770 | 482.548 |         | 2.830 | 482.485 | 0.063 |
| 1087 | 482.326 | 482.104 |         | 3.298 | 482.017 | 0.087 |

We claim:

1. An arithmetic processor comprising:

(a) a multiplier including a redundant format input for input arguments in redundant format;

(b) a bipartite lookup table coupled to the multiplier, the bipartite lookup table including fist and second component tables which together provide a bipartite table output in redundant format;

(c) an input table index characterized by a first component index formed by a first subset of the input table index, and a second component index formed by a second subset of the input table index;

(d) the first component table being indexed by the first component index, and the second component table being indexed by the second component index; and (e) in response to the input table index, the first component table outputting first component bits of redundant digits of the bipartite table output, and the second component table outputting second component bits of the redundant digits of the bipartite table output;

(f) wherein the bipartite table output is input to the redundant format input of the multiplier.

2. The arithmetic processor of claim 1, wherein responsive to a function and an input argument that includes the input table index, the outputs of the first and second component tables arc used to form a redundant function output value with the guard bits rounded-off such that the redundant function output value is then faithful in that it is accurate to one ulp (unit in the last place) as the value of the function of the input argument.

3. The arithmetic processor of claim 1, wherein responsive to a function and an input argument that includes the input table index, outputs of the first and second component tables are used to form a redundant function value output with the guard bits rounded-off such that the redundant function output value is then optimal in that, it is identical with a function output value that would result from a conventional single table accessed with the input table index, where the conventional single table is constructed to minimize the maximum relative error for each entry.

4. The arithmetic processor of claim 1, wherein the multiplier includes a Booth recoder, and wherein the redundant bipartite table output is input directly to the Booth recoder.

5. The arithmetic processor of claim 1, wherein:

(a) the redundant digits of the bipartite table output are in borrow-save format;

(b) such that first component output from the first component table is a save/positive value, and the second component output from the second component table is a borrow/negative value.

6. The arithmetic processor claim 1, wherein (a) the input table index is characterized by a high order part $X_h$ of $k_1$ bits, a middle order part $X_m$ of $k_2$ bits, and a low order part $X_1$ of $k_3$ bits, where $k_1$, $k_2$, and $k_3$ are comparable in size;

(b) the first component index is $<X_h|X_m>$ which indexes $2^{k_1+k_2}$ entries in the first component table; and (c) the second component index is $<X_h|X_1]$ which indexes $2^{k_1+k_3}$ entries in the second component table.

7. The arithmetic processor of claim 6, wherein:

(a) the number of bits in the first component table output is substantially $k_1+k_2+k_3$ bits; and (b) the number of bits in the second component table output is substantially $k_3$ bits.

8. An arithmetic processor comprising:

(a) a multiplier including a redundant format input for input arguments in redundant format:

(b) a bipartite lookup table coupled to the multiplier, the bipartite lookup table including first and second component tables which together provide a bipartite table output in redundant format;

(c) an input table index characterized by a high order part $x_h$ of $k_1$ bits, a middle order part $x_m$ of $k_2$ bits, and a low order part $x_1$ of $k_3$ bits, where $k_1$, $k_2$, and $k_3$ are comparable in size;

(d) a first component index $<x_h|x_m>$ which indexes $2^{k_1+k_2}$ entries in the first component table;

(e) a second component index $<x_h|x_1>$ which indexes $2^{k_1+k_3}$ entries in the second component table;

(f) in response to the input table index, the first component table outputting first component bits of redundant digits of the bipartite table output, and the second component table outputting second component bits of the redundant die of the bipartite table output;

(g) wherein the bipartite table output is input to the redundant format input of the multiplier.

9. The arithmetic processor of claim 8, wherein:

(a) the number of bits in the first component is substantially $k_1 + k_2 + k_3$ bits; and (b) the number of bits in the second component is substantially $k_3$ bits.

10. The arithmetic processor of claim 8, wherein responsive to a function and an input argument that includes the input table index, outputs of the first and second component tables are used to form a redundant function value output with the guard bits rounded-off such that the redundant function output value is then optimal in that, it is identical with a function output value that would result from a conventional single table accessed with the input table index, where the conventional single table is constructed to minimize the maximum relative error for each entry.

11. The arithmetic processor of claim 8, wherein the multiplier includes a Booth recoder, and wherein the redundant bipartite table output is input directly to the Booth recoder.

12. The arithmetic processor unit of claim 8, wherein:
   (a) the redundant digits of the bipartite table output are in borrow-save format;
   (b) such that first component output from the first component table is a save/positive value, and the second component output from the second component table is a borrow/negative value.

13. A function computation method for use in an arithmetic processor that performs function evaluation using a function computation unit having a plurality of input operands where at least one input operand is in redundant format, and a bipartite lookup table that provides a table output value in redundant digit format with each redundant digit comprising first component and second component bits; comprising the steps:
   (a) constructing first and second component tables which together form a bipartite lookup table that is indexed with an input table index such that the first component table is indexed with a first component index formed by a first subset of the input table index to obtain the first component bits of the redundant digits of the table output value, and the second component table is indexed with a second component index formed by a second subset of the input table index to obtain the second component bits of the redundant digits of the table output value, the first and second component bits forming the table output value in redundant digit format;
   (b) inputting a specified input table index to obtain a corresponding table output value; and
   (c) inputting the corresponding table output value as the at least one redundant digit format input operand to the function computation unit.

14. The function computation method of claim 13, wherein responsive to a function and an input argument that includes the input table index, the outputs of the first and second component tables are used to form a redundant function output value with the guard bits rounded-off such that the redundant function output value is then faithful in that it is accurate to one ulp (unit in the last place) as the value of the function of the input argument.

15. The function computation method of claim 13, wherein responsive to a function and an input argument that includes the input table index, outputs of the first and second component tables are used to form a redundant function value output with the guard bits rounded-off such that the redundant function output value is then optimal in that, it is identical with a function output value that would result from a conventional single table accessed with the input table index, where the conventional single table is constructed to minimize the maximum relative error for each entry.

16. The function computation method of claim 13, wherein:
   (a) the redundant digits of the bipartite table output are in borrow-save format;
   (b) such that first component output from the first component table is a save/positive value, and the second component output from the second component table is a borrow/negative value.

17. The function computation method of claim 13, wherein:
   (a) the input table index is characterized by a high order part $x_h$ of $k_1$ bits, a middle order part $x_m$ of $k_2$ bits, and a low order part $x_1$ of $k_3$ bits, where kl, $k_2$, and $k_3$ are comparable in size;
   (b) the first component index is $<x_h|x_m>$ which indexes $2^{k1+k2}$ entries in the first component table; and
   (c) the second component index is $<x_h|x_1>$ which indexes $2^{k1+k2}$ entries in the second component table.

18. The function computation method of claim 17, wherein:
   (a) the number of bits in the first component is substantially $k_1+k_2+k_3$ bits; and
   (b) the number of bits in the second component is substantially $k_3$ bits.

* * * * *